US008590543B2

(12) United States Patent
Goff et al.

(10) Patent No.: US 8,590,543 B2
(45) Date of Patent: Nov. 26, 2013

(54) HAIR EXTENSION KIT

(75) Inventors: Christopher Goff, Redondo Beach, CA (US); Joy Lyn Burns, Redondo Beach, CA (US); Paul Tsu-Peng King, Newbury Park, CA (US); Craig Stock, Torrance, CA (US); Eric Edward Skifstrom, Manhattan Beach, CA (US); Carolyn Holden Buse, Santa Monica, CA (US); Natalie Repp Zigal, Culver City, CA (US); Thomas Earl Washington, Cerritos, CA (US); Abimael Cordova, La Mirada, CA (US)

(73) Assignee: Mattel, Inc., El Segundo, CA (US)

(*) Notice: Subject to any disclaimer, the term of this patent is extended or adjusted under 35 U.S.C. 154(b) by 30 days.

(21) Appl. No.: 13/097,826

(22) Filed: Apr. 29, 2011

(65) Prior Publication Data

US 2012/0118315 A1 May 17, 2012

Related U.S. Application Data

(60) Provisional application No. 61/414,809, filed on Nov. 17, 2010.

(51) Int. Cl.

| | |
|---|---|
| ***A41G 3/00*** | (2006.01) |
| ***A41G 5/00*** | (2006.01) |
| ***A45D 44/00*** | (2006.01) |
| ***A45D 7/02*** | (2006.01) |
| ***A45D 8/12*** | (2006.01) |
| ***G09F 1/00*** | (2006.01) |
| ***A63H 3/44*** | (2006.01) |
| ***G09B 19/10*** | (2006.01) |

(52) U.S. Cl.
USPC ............... 132/53; 132/56; 132/212; 132/275; 132/333; 40/124.11; 446/394; 434/94

(58) Field of Classification Search
USPC ............. 132/201, 53–56, 212, 105, 273, 200, 132/333, 275; 206/730, 733, 734, 750, 206/39.7, 823, 581; 434/81, 94; 446/394, 446/901; 40/124.11, 124.12, 124.16, 40/661.09, 661.11, 409, 594, 124.09; 283/107; 428/41.7, 41.8; 101/405
See application file for complete search history.

(56) References Cited

U.S. PATENT DOCUMENTS

| | | | | |
|---|---|---|---|---|
| 2,835,259 | A * | 5/1958 | Goodman | 132/53 |
| 3,382,607 | A | 5/1968 | Ryan et al. | |
| 3,433,232 | A | 3/1969 | Garrett | |

(Continued)

FOREIGN PATENT DOCUMENTS

| | | | |
|---|---|---|---|
| FR | 2432190 | A * | 3/1980 |
| FR | 2747897 | A1 * | 10/1997 |

(Continued)

OTHER PUBLICATIONS

International Preliminary Report on Patentability for PCT/US2011/058301, dated May 21, 2013, 6 pages.

*Primary Examiner* — Vanitha Elgart
(74) *Attorney, Agent, or Firm* — Edell, Shapiro & Finnan LLC

(57) ABSTRACT

A hair extension kit may be packaged in such a way that patterns may be readily printed onto the hair using a standard printer. The hair extension may be removable from the kit to easily accessorize a girl's or doll's hair.

20 Claims, 39 Drawing Sheets

(56) References Cited

U.S. PATENT DOCUMENTS

| | | | | | |
|---|---|---|---|---|---|
| 3,568,684 | A | | 3/1971 | Reece | |
| 3,599,647 | A | | 8/1971 | Fabbri | |
| 4,257,188 | A | | 3/1981 | Barker | |
| 4,583,562 | A | * | 4/1986 | Stewart | 132/212 |
| 4,912,944 | A | * | 4/1990 | Crosley et al. | 63/29.2 |
| 5,117,569 | A | * | 6/1992 | Bean | 40/124.11 |
| 5,309,365 | A | | 5/1994 | Sullivan et al. | |
| 5,318,327 | A | * | 6/1994 | Daneshvar | 283/117 |
| 5,372,506 | A | | 12/1994 | Hambright | |
| 5,413,124 | A | * | 5/1995 | Incando | 132/201 |
| 5,421,765 | A | | 6/1995 | Lehmann et al. | |
| 5,578,353 | A | | 11/1996 | Drew, III | |
| 5,664,590 | A | | 9/1997 | Plateroti et al. | |
| 5,705,243 | A | * | 1/1998 | Mehta et al. | 428/40.1 |
| 5,743,185 | A | | 4/1998 | Hippely et al. | |
| 5,775,919 | A | * | 7/1998 | Gardner | 434/408 |
| 5,779,479 | A | * | 7/1998 | Hawiuk | 434/94 |
| 5,799,669 | A | | 9/1998 | Briggs | |
| 5,816,269 | A | | 10/1998 | Mohammed | |
| 5,823,204 | A | | 10/1998 | Todd | |
| 5,836,998 | A | | 11/1998 | Mueller et al. | |
| 5,842,905 | A | | 12/1998 | Lee et al. | |
| 5,845,653 | A | | 12/1998 | Abercrombie | |
| 5,848,599 | A | | 12/1998 | Todd | |
| 5,875,788 | A | * | 3/1999 | Loren | 132/53 |
| 5,913,315 | A | | 6/1999 | Todd | |
| 5,931,166 | A | | 8/1999 | Weber et al. | |
| 6,019,107 | A | * | 2/2000 | Overmyer et al. | 132/53 |
| 6,035,860 | A | | 3/2000 | Mombourquette | |
| 6,053,178 | A | | 4/2000 | Todd | |
| 6,065,969 | A | | 5/2000 | Rifkin et al. | |
| 6,067,996 | A | | 5/2000 | Weber et al. | |
| 6,073,635 | A | | 6/2000 | Todd | |
| 6,280,281 | B1 | | 8/2001 | Unalp | |
| 6,286,517 | B1 | | 9/2001 | Weber et al. | |
| 6,293,592 | B1 | * | 9/2001 | Robertson et al. | 283/117 |
| 6,328,949 | B1 | | 12/2001 | Tessarolo et al. | |
| 6,336,694 | B1 | | 1/2002 | Ishizaka | |
| 6,470,608 | B1 | * | 10/2002 | Edwards | 40/124 |
| 6,525,724 | B1 | | 2/2003 | Takami | |
| 6,581,609 | B2 | * | 6/2003 | Ott | 132/201 |
| 6,607,699 | B1 | | 8/2003 | Elliott et al. | |
| 6,634,366 | B1 | * | 10/2003 | Simmons et al. | 132/53 |
| 6,736,692 | B1 | | 5/2004 | Hoyos-Zermeno et al. | |
| 6,746,165 | B2 | | 6/2004 | de Laforcade | |
| 6,848,452 | B2 | | 2/2005 | Kennedy et al. | |
| 6,871,429 | B2 | * | 3/2005 | Shea | 40/124.09 |
| 6,935,348 | B2 | * | 8/2005 | Gold | 132/53 |
| 6,973,931 | B1 | | 12/2005 | King | |
| 7,096,615 | B2 | * | 8/2006 | Gardi | 40/124.06 |
| 7,123,983 | B2 | | 10/2006 | Yogo et al. | |
| 7,156,104 | B2 | | 1/2007 | Kennedy et al. | |
| 7,156,885 | B2 | | 1/2007 | Kennedy et al. | |
| 7,168,432 | B1 | * | 1/2007 | Brumfield | 132/53 |
| 7,201,171 | B2 | * | 4/2007 | Sthair | 132/201 |
| 7,246,447 | B2 | | 7/2007 | Demko | |
| 7,290,550 | B2 | | 11/2007 | Sim | |
| 7,472,708 | B2 | | 1/2009 | Eigenbrod et al. | |
| 7,533,676 | B2 | * | 5/2009 | Sthair | 132/201 |
| 7,610,921 | B2 | * | 11/2009 | Gold | 132/53 |
| 7,629,459 | B2 | * | 12/2009 | Kobayashi et al. | 544/184 |
| 8,038,724 | B2 | | 10/2011 | Cho et al. | |
| 2001/0035192 | A1 | * | 11/2001 | Townsend | 132/201 |
| 2003/0005941 | A1 | | 1/2003 | Iosilevich | |
| 2004/0211437 | A1 | | 10/2004 | Kennedy et al. | |
| 2004/0226858 | A1 | * | 11/2004 | Jhung | 206/733 |
| 2005/0115581 | A1 | * | 6/2005 | Choi | 132/53 |
| 2005/0150508 | A1 | | 7/2005 | Downs et al. | |
| 2005/0194015 | A1 | * | 9/2005 | Watts | 132/53 |
| 2006/0169296 | A1 | * | 8/2006 | Gill et al. | 132/53 |
| 2007/0009454 | A1 | | 1/2007 | Thevenet | |
| 2007/0049832 | A1 | | 3/2007 | Edgar et al. | |
| 2007/0119469 | A1 | * | 5/2007 | Cho et al. | 132/53 |
| 2007/0155280 | A1 | | 7/2007 | Patean et al. | |
| 2007/0227550 | A1 | | 10/2007 | Merszei | |
| 2008/0023532 | A1 | * | 1/2008 | Moresi | 229/92.8 |
| 2008/0083418 | A1 | | 4/2008 | Glenn et al. | |
| 2008/0083420 | A1 | | 4/2008 | Glenn et al. | |
| 2008/0087291 | A1 | | 4/2008 | Jordan | |
| 2008/0190442 | A1 | * | 8/2008 | Kwak | 132/273 |
| 2008/0194971 | A1 | | 8/2008 | Edgar et al. | |
| 2008/0257369 | A1 | * | 10/2008 | Poole | 132/53 |
| 2008/0295856 | A1 | * | 12/2008 | Kallabat et al. | 132/201 |
| 2009/0025747 | A1 | | 1/2009 | Edgar et al. | |
| 2009/0120451 | A1 | * | 5/2009 | Kenna | 132/201 |
| 2009/0241979 | A1 | | 10/2009 | Navarro et al. | |
| 2009/0260567 | A1 | | 10/2009 | Ozuna et al. | |
| 2009/0260649 | A1 | * | 10/2009 | Sakurai et al. | 132/201 |
| 2009/0266377 | A1 | | 10/2009 | Matsumoto et al. | |
| 2010/0000562 | A1 | | 1/2010 | Cho et al. | |
| 2010/0139682 | A1 | | 6/2010 | Edgar et al. | |
| 2010/0224210 | A1 | | 9/2010 | Rabe et al. | |
| 2010/0252061 | A1 | | 10/2010 | Samain et al. | |
| 2011/0005544 | A1 | * | 1/2011 | Lane | 132/201 |
| 2011/0056510 | A1 | | 3/2011 | Westlake | |
| 2011/0253165 | A1 | * | 10/2011 | Kenna | 132/273 |
| 2012/0073592 | A1 | * | 3/2012 | Koenig et al. | 132/201 |

FOREIGN PATENT DOCUMENTS

| | | | | |
|---|---|---|---|---|
| FR | 2780341 | A1 | | 12/1999 |
| GB | 2182857 | A | | 5/1987 |
| JP | 09228130 | A | | 9/1997 |
| JP | 2007-146359 | A | | 6/2007 |
| JP | 2009046621 | A | * | 3/2009 |

* cited by examiner

2800

2900

| MATERIAL | FORM A | FORM B | FORM C | FORM D | FORM E | FORM F | FORM G | FORM H | FORM I | FORM J | FORM K | FORM L | FORM M |
|---|---|---|---|---|---|---|---|---|---|---|---|---|---|
| DIONIZED WATER | 88.95 | 78.95 | 43.95 | 48.95 | 33.95 | 31.3 | 25.7 | 5.5 | 5.5 | 5.5 | 5.5 | 5.5 | 5.5 |
| CELVOL 203S (25%SOLN) | | | | | | | | 63 | 58 | 58 | 57 | | |
| CELVOL 203S (20%SOLN) | | | | | | | | | | | | 60 | 49 |
| PVP K-120 | | | | | 5 | 3 | 2.6 | 3.2 | | | | | |
| PVP K-90 | 10 | 10 | 15 | 15 | | | | | 3.2 | 3.2 | 3.2 | 5 | 5 |
| TEA | | | | | | | | 0.8 | 0.8 | 0.8 | 0.8 | 0.8 | 0.8 |
| DENAT. ALCOHOL | | | 10 | 10 | 10 | 10 | 9 | 10.5 | 10.5 | 10.5 | 10.5 | 10 | 7 |
| BAYHYDROL XP206 | | 10 | 15 | | 10 | 25 | 18 | 16 | 15 | 15 | 10 | 18 | 16 |
| BAYHYDROL 124 | | | | | | 30 | 26 | | | | | | |
| JONCRYL 540 | | | | | | | 18 | | | | | | |
| ARFLEX 465 | | | | | | | | | | | | | 16 |
| AVALURE UR405 | | | 15 | | | | | | | | | | |
| CARBOSET | | | | 25 | | | | | | | | | |
| JONCRYL 120 | | | | | 35 | | | | | | | | |
| CALCIUM CARBONATE | | | | | 5 | | | | | | | | |
| CELLOGEN HP4H | 0.15 | 0.15 | 0.15 | 0.15 | 0.15 | | | | | | | | |
| MICHEM EMULSION 09625 | | | | | | | | | 6 | | 6 | | |
| MICHEM EMULSION 28640 | | | | | | | | | | 6 | 6 | | |
| PFENONIP XB | 0.9 | 0.9 | 0.9 | 0.9 | 0.9 | 0.7 | 0.7 | 1 | 1 | 1 | 1 | 0.7 | 0.7 |
| TOTAL | 100 | 100 | 100 | 100 | 100 | 100 | 100 | 100 | 100 | 100 | 100 | 100 | 100 |

3800

FIG.38

3900

| MATERIAL | FORM 1 | FORM 2 | FORM 3 |
|---|---|---|---|
| DIONIZED WATER | 83 | 81.95 | 77.05 |
| DENAT. ALCOHOL | 5 | 5 | 5 |
| AMP 95 | 0.5 | 1 | 1 |
| GLYCERIN 99.5% | 5 | 5 | 8 |
| CARBOWAX 400 | 1 | 2 | 3 |
| NATROSOL 250 HH | 0.2 | 0.2 | 0.25 |
| EDTA | 0.05 | 0.1 | 0.2 |
| SODIUM TETRA BORATE (ANGYDROUS) | 0.05 | 0.05 | 0.05 |
| SODIUM CARBONATE | 0.5 | 0.5 | 1 |
| SODIUM SULFATE | 1.5 | 1 | 0.75 |
| SODIUM PYROPHOSPHATE | 0.7 | 0.7 | 0.7 |
| SODIUM PHOSPHATE DIBASIC | 1.5 | 1.5 | 2 |
| PHENONIP XB | 1 | 1 | 1 |
| TOTAL | 100 | 100 | 100 |

FIG.39

HAIR EXTENSION KIT

CROSS-REFERENCE TO RELATED APPLICATIONS

This application claims priority to U.S. Provisional Patent Application Ser. No. 61/414,809, filed on Nov. 17, 2010, entitled “Hair Extension Kit”, the contents of which are incorporated herein by reference.

FIELD OF THE INVENTION

The disclosure relates generally to hair extension kits. More specifically, the hair extensions may be packaged such that they may have patterns printed onto them.

BACKGROUND

Individuals often desire creative ways to express their personalities. One form of expression is the transformation or decoration of one’s body or portions of one’s body. Forms of bodily decoration include painting finger- or toe-nails or administering cosmetics. Another form includes styling one’s hair and the insertion of hair extensions to supplement one’s natural hair. One looking to further their creative outlet may look to further customize their hair extensions.

U.S. Pat. No. 6,065,969 (“Rifkin”) discloses a computer game for designing and printing nail coverings. The computer game includes stored software instructions on a computer that controls operation of a color printer and a series of displayed images on a monitor display screen. The user selects from various icons displayed on the monitor display screen, and the icons are applied to fingernails of a hand image on the screen. A plurality of nail covers, which are formed of a peel and stick self-adhesive structure, are printed upon a blank laminated sheet. The nail covers may be independently removed from the sheet and placed upon a fingernail by the self-adhesive layer. While Rifkin provides an adequate solution for customizing fingernail decorations, Rifkin does not provide a solution for hair extensions.

U.S. Patent Application Publication No. 2010/0000562 A1 (“Cho”) discloses decorated hair pieces and a method for decorating hair pieces. A plurality of fiber single-ply threads are grouped such that designs may be created on desired portions of the plurality of fiber single-ply threads. Various dispersion dyes on transcription paper may be applied to the surface of the single-ply threads with a heat pressing process. Cho’s process requires specialized equipment, such as transcription paper, specialized dispersion dyes, and a heat-and-pressure source. This specialized equipment lacks convenience and may prove a safety hazard for consumers of a younger demographic.

SUMMARY

The disclosure includes a hair extension kit. The hair extension kit may be packaged in such a way that patterns may be readily printed onto the hair using a standard printer. The hair extension may be removable from the kit to easily accessorize a girl’s or doll’s hair.

Other systems, methods, features and advantages will be, or will become, apparent to one with skill in the art upon examination of the following figures and detailed description. All such additional systems, methods, features and advantages are included within this description, are within the scope of the claimed subject matter, and are protected by the following claims.

BRIEF DESCRIPTION OF THE DRAWINGS

The hair extension kit may be better understood with reference to the following drawings and description. The elements in the figures are not necessarily to scale, emphasis instead being placed upon illustrating the principles of the hair extension kit. In the figures, like-referenced numerals designate corresponding parts throughout the different views.

FIG. 38 is a spreadsheet with various exemplary formulations of a receptive coating material.

FIG. 39 is a spreadsheet with various exemplary formulations of a chemical sealant.

DETAILED DESCRIPTION

A hair extension set includes a plurality of hair fibers arranged in a single layer adhered to a support backing. The hair extension set may be packaged with the support backing in a kit in such a way that one or more patterns, such as designs, images, pictures, or text, may be readily printed onto the hair fibers using an off-the-shelf desktop printer. The support backing may be foldable such that portions of the packaging cover and protect the hair fibers during transport. The hair extension set may be removable from the kit to easily accessorize a girl's or doll's hair.

Figure 1:
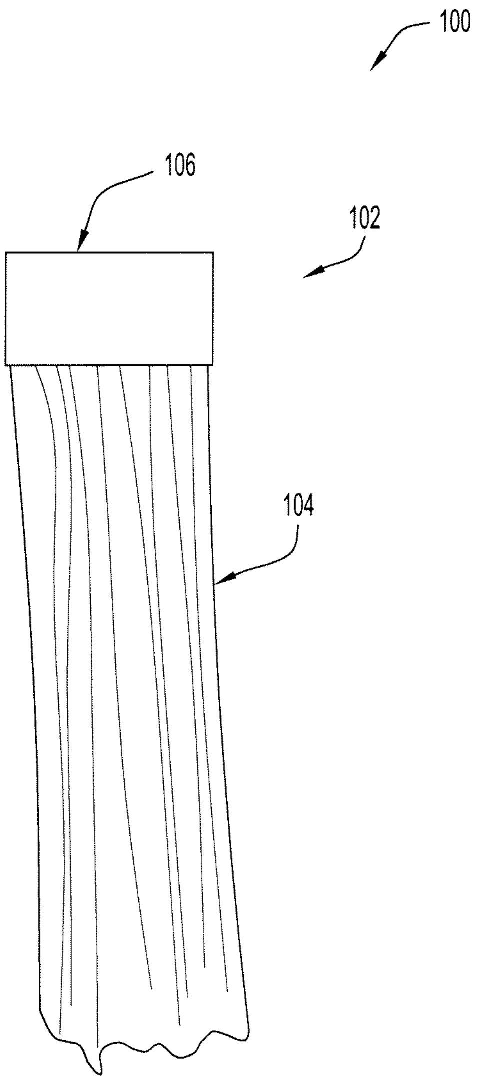
FIG. 1 is a drawing of an exemplary hair extension set.

FIG. 1 is a drawing 100 of a hair extension set 102 according to one embodiment of the present invention. The hair extension set 102 may be used as part of a hair accessory or to make a longer, fuller, or different hairstyle. The hair extension set 102 includes a plurality of hair fibers 104 attached to a hair extension support member 106. The hair fibers 104 may include strands of natural human hair, threads of synthetic fibers, or a combination of natural hair and synthetic fibers. Natural hair may provide durability, while synthetic fibers may provide ease of manufacture and controllability of physical or chemical properties.

The hair fibers 104 may all be of approximately the same length or may come pre-styled, such as with a tapered or angled cut. Providing hair fibers 104 of the same length may provide for uniformity in manufacture, while pre-styled hair fibers 104 may be more visually striking or appeal to a particular consumer demographic. The hair fibers 104 may all have approximately the same color or may have a blend of different colors. The hair fibers 104 may have particular desirable properties, such as an enhanced ability to retain ink from an inkjet printer.

The hair extension support member 106 may provide a singular base from which the hair fibers 104 may be manipulated. For example, attaching the hair extension support member 106 to a surface may functionally attach the hair fibers 104 to that surface as well. The hair extension support member 106 may be made from a natural or synthetic material, such as leather or vinyl. In one embodiment, the hair extension support member 106 may be a piece of adhesive tape wrapped around one end of the hair fibers 104. The hair fibers 104 may be attached to the hair extension support member 106 through an adhesive, such as an epoxy or glue, or through some physical means, such as stitching or melting a portion of the hair fibers 104 to the hair extension support member 106.

Figure 2:
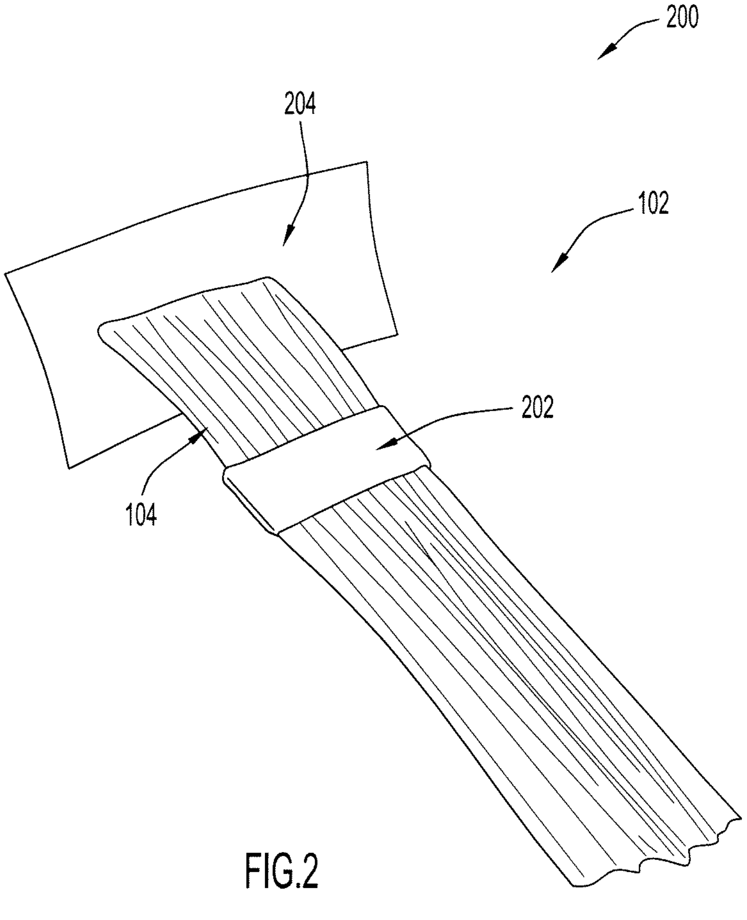
FIG. 2 is a drawing of a hair extension set at an early stage of assembly.

FIG. 2 is a drawing 200 of a hair extension set 102 at an early stage of assembly. The hair fibers 104 may be arranged in a single-ply or single-layered configuration, i.e. a single layer of hair fibers 104 without any hair fibers 104 stacked on top of another. The hair fibers 104 are shown being attached to alternate versions of the hair extension support member 106. In this illustration, the hair extension support member 106 may be a wrapper 202, such as a piece of adhesive tape, or a support panel 204, such as a panel of vinyl. The piece of tape may be wrapped around the hair fibers 104, while the panel of vinyl may be folded over the ends of the hair fibers 104 and stitched together, for example.

Figure 3:
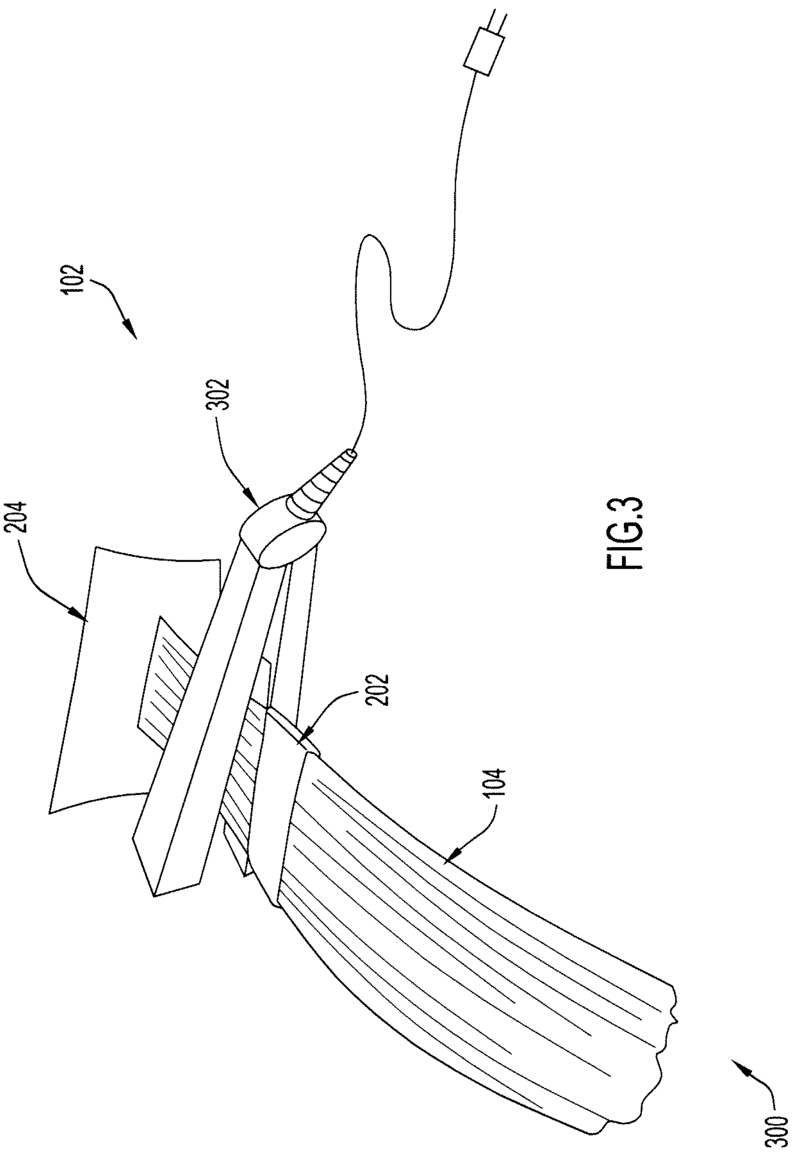
FIG. 3 is a drawing of a hair extension set at an intermediate stage of assembly.

FIG. 3 is a drawing 300 of a hair extension set 102 at an intermediate stage of assembly. The hair fibers 104 are bound by a wrapper 202, such as adhesive tape. A heat transfer apparatus 302, such as a hot iron, is applied to the hair fibers 104. Heat from the hot iron may cause the hair fibers 104 to melt and fuse together where the hot iron contacts the hair fibers 104. The hot iron may be applied to the hair fibers 104 along one edge of the adhesive tape. The heat may melt and fuse the hair fibers 104 to the adhesive tape, thus further securing and heat-sealing the hair fibers 104 along one edge of the adhesive tape. In this example, the support panel 204 may be attached to one end of the hair fibers 104 and be used to easily remove excess hair fiber ends after the heat-sealing process.

Figure 4:
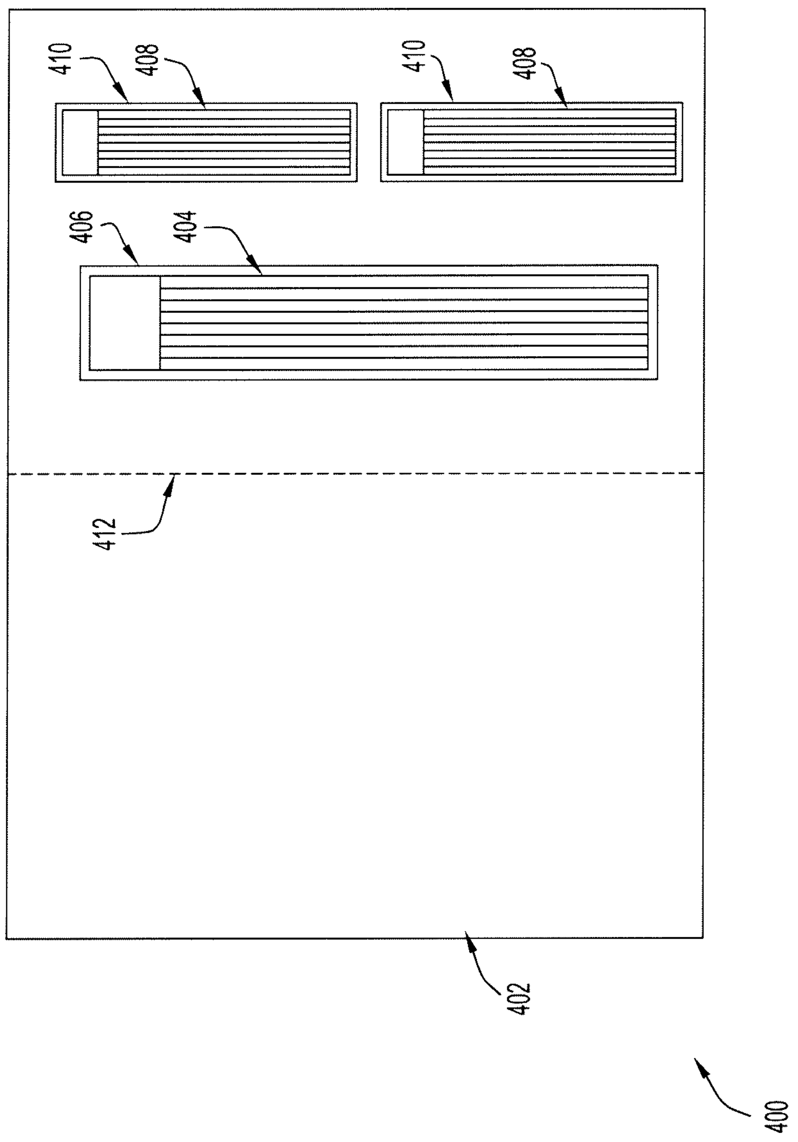
FIG. 4 is an illustration of an exemplary hair extension kit.

FIG. 4 is an illustration 400 of a hair extension kit 402 according to one embodiment of the present invention. The hair extension kit 402 includes a support backing 402 and a hair extension set 404. The support backing 402 may be a form of packaging upon which the hair extension set 404 is transported and distributed. In this illustrative example, the support backing 402 is one 8.5"×11" sheet of paper stock. In other embodiments, the support backing 402 may be a sheet of paper stock of another standardized size or of any other suitable material.

The hair extension set 404 may be removably attached to the support backing 402. In this illustrative example, the means of attachment is an adhesive layer 406. The adhesive layer 406 temporarily affixes the hair extension set 404 to the support backing 402 through transport, delivery, and further processing until an end consumer voluntarily separates the hair extension set 404 from the support backing 402. The adhesive layer 406 may be in a sheet form with a light adhesive coating on a front surface and a more permanent adhesive coating on a back surface. One such sheet is a removable adhesive label sold under the POST-IT brand of the company 3M. The adhesive layer 406 may extend across one entire surface of the support backing 402, or across only a portion thereof. The adhesive layer 406 in this example has been custom-sized to fit the hair extension set 404. Using a single layer may reduce processing costs, while custom-sizing the layers may reduce materials costs. The hair extension set 404 may be similar to or the same as the hair extension set 102 described above.

This exemplary hair extension kit 402 also includes two smaller hair extension sets 408. The smaller hair extension sets 408 may be desirable to provide variety or for attaching to smaller children, a doll, or a pet. The smaller hair extension sets 408 are removably attached to the support backing 402 by smaller adhesive layers 410. The smaller adhesive layers 410 may be similar to the adhesive layer 406 described above. However, in embodiments where a single adhesive layer covers a sufficient portion of the surface of the support backing, multiple hair extension sets may be removably attached to the adhesive layer.

The support backing 402 includes a fold 412. The fold 412 may permit the support backing 402 to bend such that a first portion of the support backing 402 covers a second portion of the support backing 402. In this example, the fold 412 is positioned such that the left half may fold over and cover the right half, or vice versa.

Figure 5:
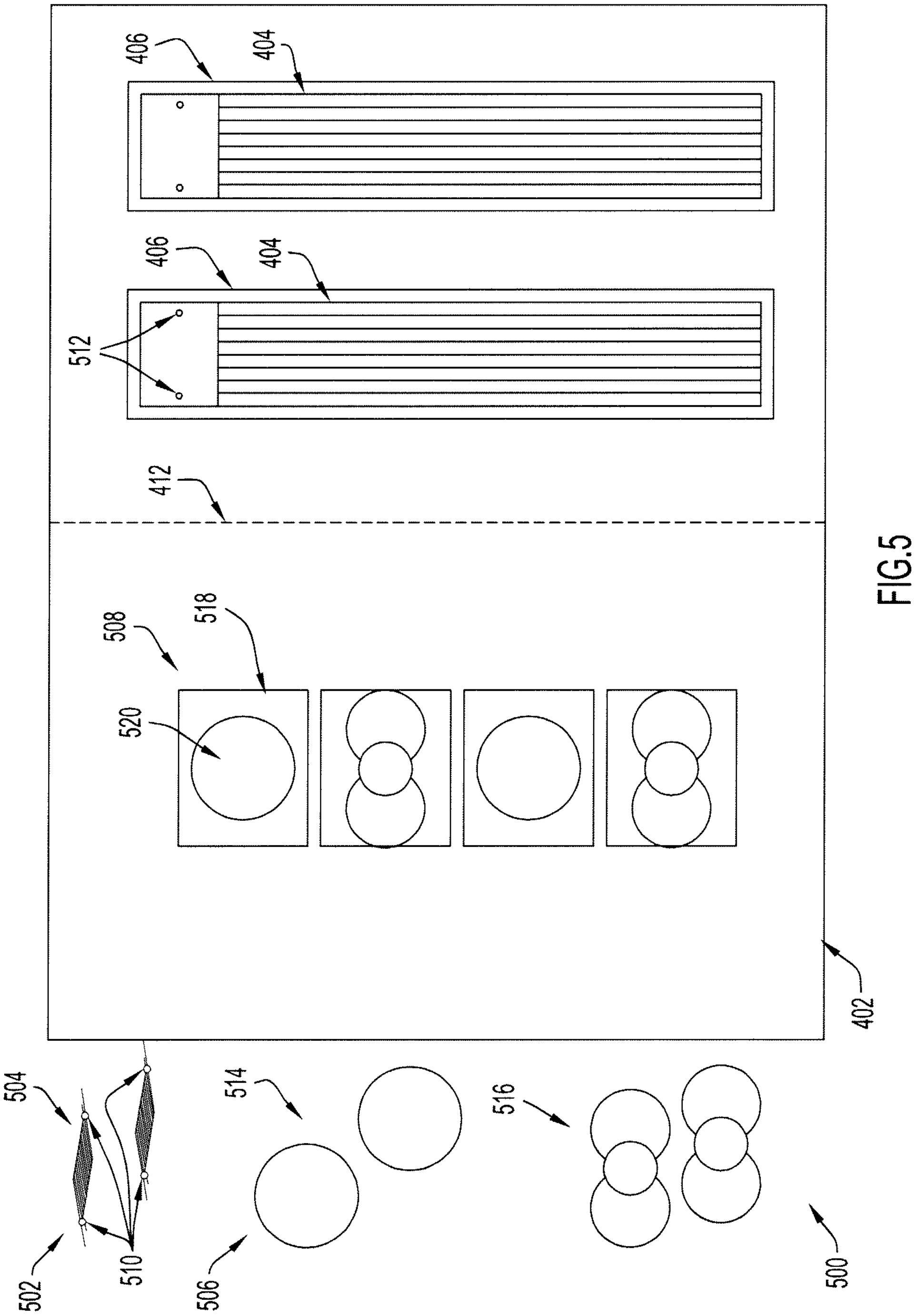
FIG. 5 is an illustration of another exemplary hair extension kit.

FIG. 5 is an illustration 500 of a hair extension kit 502 of another embodiment of the present invention. The hair extension kit 502 includes the support backing 402, two hair extension sets 404, two adhesive layers 406, and the fold 412. While the two hair extension sets 404 in this example are of the same width and length, the hair extension sets 404 need not be of the same dimensions, nor need there be more than one hair extension set. Some embodiments include a single hair extension set. The hair extension kit 502 in this example may be packaged with hair fasteners 504 and hair fastener accessory bases 506 and may further include hair fastener accessory labels 508.

The hair extension sets 404 may attach to the hair fasteners 504, and the hair fasteners 504, in turn, may attach to human, doll, or pet hair. For example, the hair fasteners 504 may be barrettes, hair pins, hair clasps, or bobby pins. The hair fasteners 504 may clasp onto support members of the hair extension sets 404. The clasping may be aided by attachment nubs 510 or other structure on the hair fasteners 504, which align with attachment holes 512 or other structure in the support members of the hair extension sets 404.

The hair fastener accessory bases 506 may attach to the hair fasteners 504. The hair fastener accessory bases 506 may further decorate the hair fasteners 504 and the hair extension sets 404. The hair fastener accessory bases 506 may attach to the hair fasteners 504 by use of a clip, a glue, or another adhesive, for example. The hair fastener accessory bases 506 may include bases of different shapes, such as circular-shaped bases 514 and ribbon-shaped bases 516, or different sizes. The hair fastener accessory bases 506 may have one flat surface upon which to receive an adhesive label, such as a sticker from the hair fastener accessory label 508.

The hair fastener accessory labels 508 include a label base 518 and an adhesive sticker 520. The back of the label base 518 may be solidly affixed to the support backing 402. The adhesive sticker 520 may be removable from the label base 518 and, once removed, attachable to a flat surface, such as one on the hair fastener accessory bases 506. For example, a round sticker may attach to a round accessory base. A front surface of the adhesive sticker 520 may be of a material to receive printing, e.g. from an inkjet printer. Such a material may be similar to the printable address labels available from AVERY-DENNISON.

Figure 6:
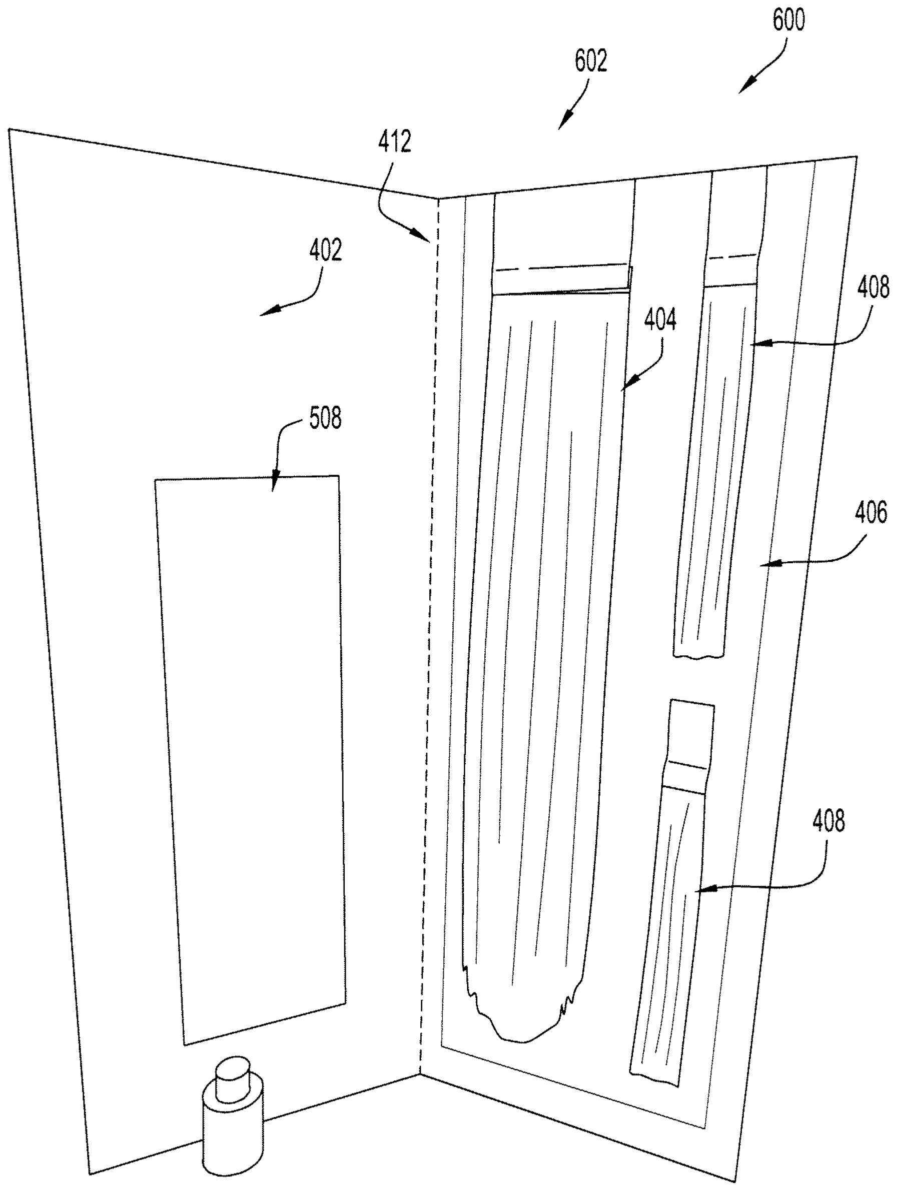
FIG. 6 is a photograph of an exemplary hair extension kit.

FIG. 6 is a photograph 600 of a hair extension kit 602 according to yet another embodiment of the present invention. The hair extension kit 602 includes the support backing 402, the hair extension set 404, the two smaller hair extension sets 408, the fold 412, and hair fastener accessory labels 508. In this example, a single adhesive layer 406 holds the hair extension sets 404, 408 to the support backing 402.

Figure 7:
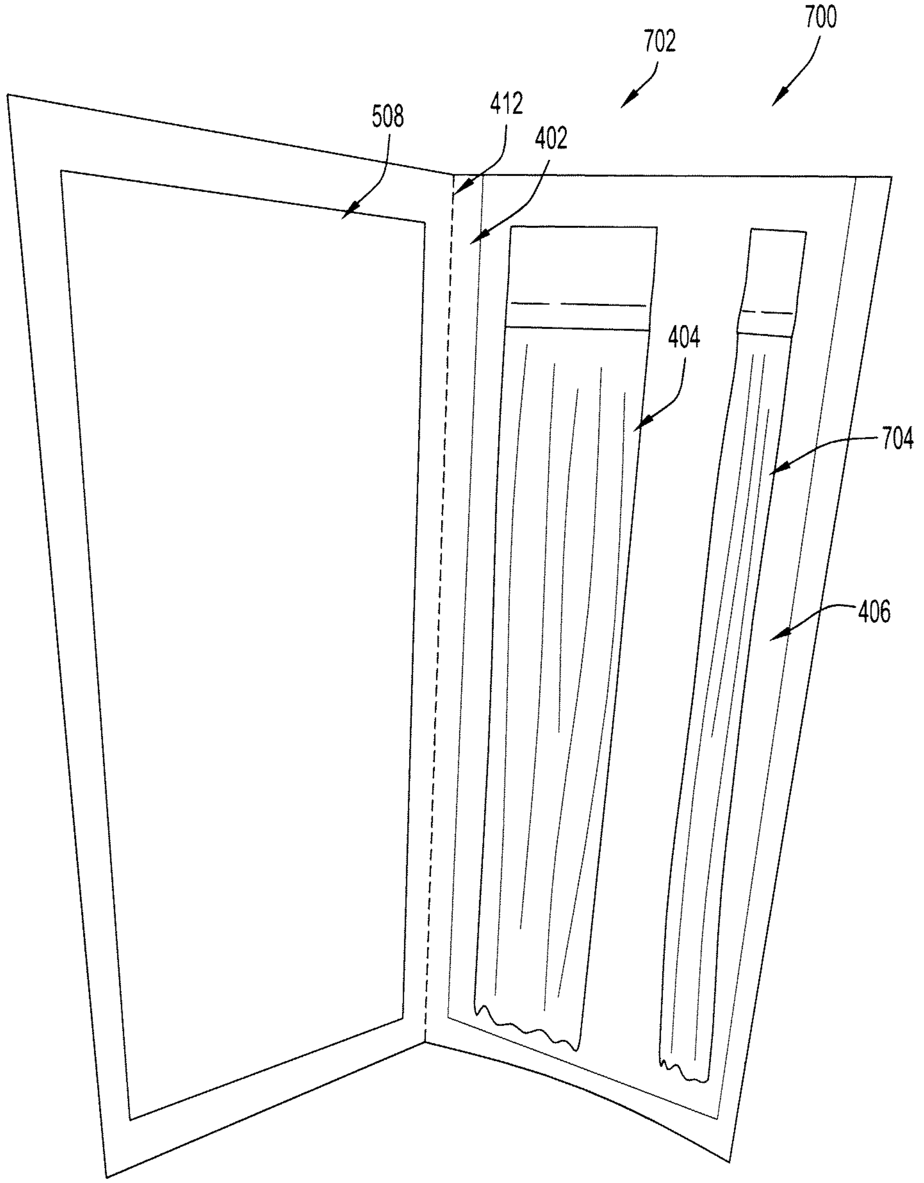
FIG. 7 is a photograph of a different exemplary hair extension kit.

FIG. 7 is a photograph 700 of a hair extension kit 702 according to a different embodiment of the present invention. The hair extension kit 702 includes the support backing 402, the hair extension set 404, the fold 412, and the hair fastener accessory labels 508. In this example, a single adhesive layer 406 holds the hair extension set 404 and a narrower hair extension set 704 to the support backing 402.

Figure 8:
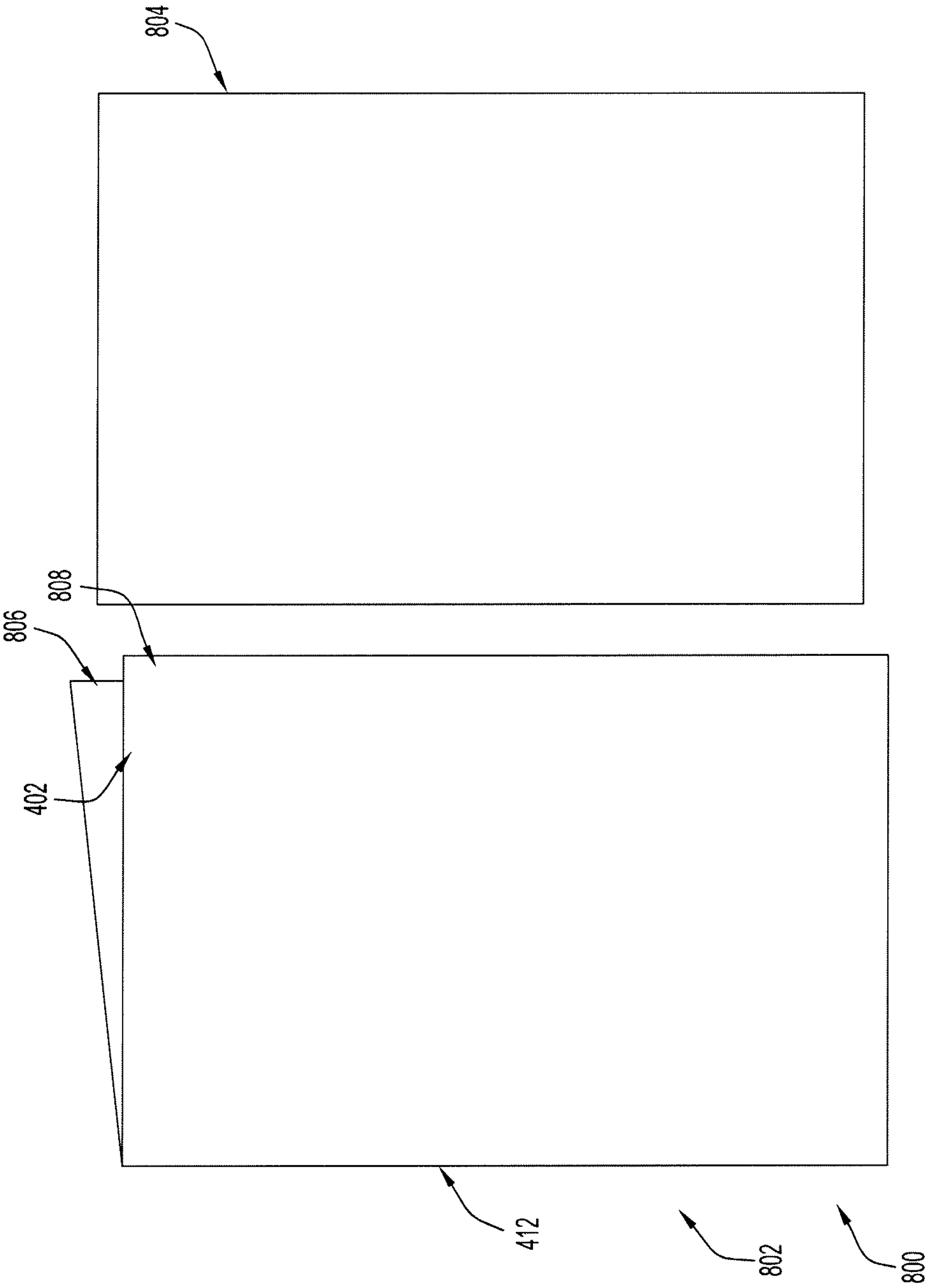
FIG. 8 is an illustration of yet a different exemplary hair extension kit.

FIG. 8 is an illustration 800 of a hair extension kit 802 according to yet a different embodiment of the present invention. The hair extension kit 802 includes the support backing 402 and a protective sheet 804. The support backing 402 includes a front side 806 and a back side 808, which may also be called an “inside” and an “outside” surface, respectively. The front side 806 may include a surface portion where a hair extension set 404 may be attached. The back side 808 may be a blank surface, or it may be utilized for print, such as advertising or logo artwork. The support backing 402 is shown bent along the fold 412, thus creating a bi-fold configuration and appearing similar to a greeting card. In this configuration, one surface portion of the front side 806 may fold over a second portion of the front side 806, therefore providing a protective cover for the surface portion and any contents within the folded front side 806, e.g. while the hair extension kit 802 is in transport.

The protective sheet 804 may provide additional protection to a surface portion of the support backing 402 or to various contents contained within or on the support backing 402. For example, the protective sheet 804 may be placed between the folded portions of the inside surface, thus effectively separating the portions from contact with each other. In a similar manner, the protective sheet 804 may also separate contents, such as a hair extension set 404, attached to one portion of the inside surface from direct contact with an opposite portion of the inside surface. If the protective sheet 804 were a sheet of wax paper, for example, the protective sheet 804 could prevent an opposite side from directly rubbing against hair fibers and loosening the hair fibers from an adhesive layer.

Figure 9:
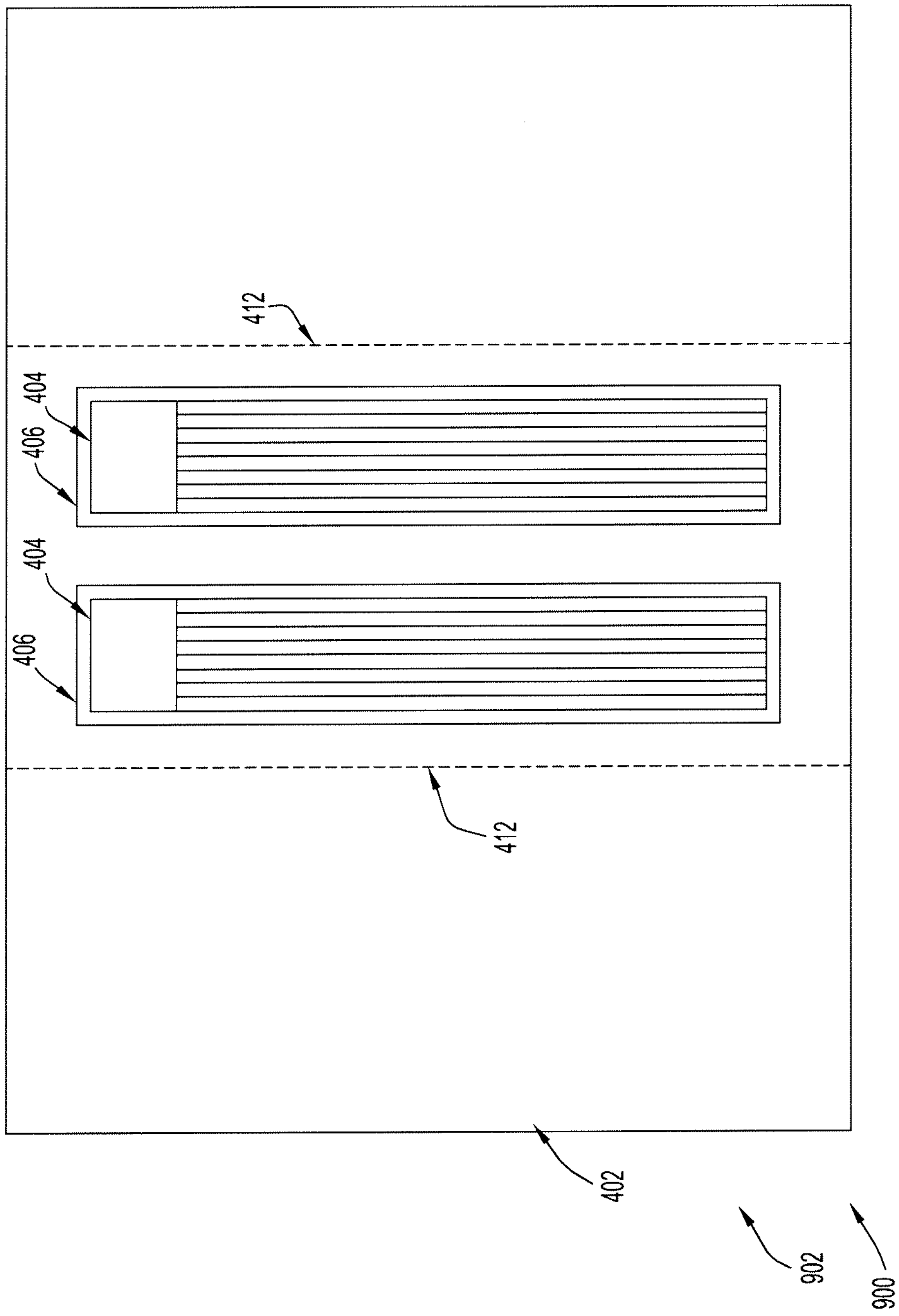
FIG. 9 is an illustration of an alternate exemplary hair extension kit.

FIG. 9 is an illustration 900 of a hair extension kit 902 according to an alternate embodiment of the present invention. The hair extension kit 902 includes the support backing 402 and the hair extension sets 404 attached to the support backing 402 by the adhesive layers 406. The support backing 402 in this example includes two folds 412 on the support backing 402 spaced to both sides of the hair extension sets 404, thus creating a tri-fold configuration. The support backing 402 in this configuration appears similar to a pamphlet.

Figure 10:
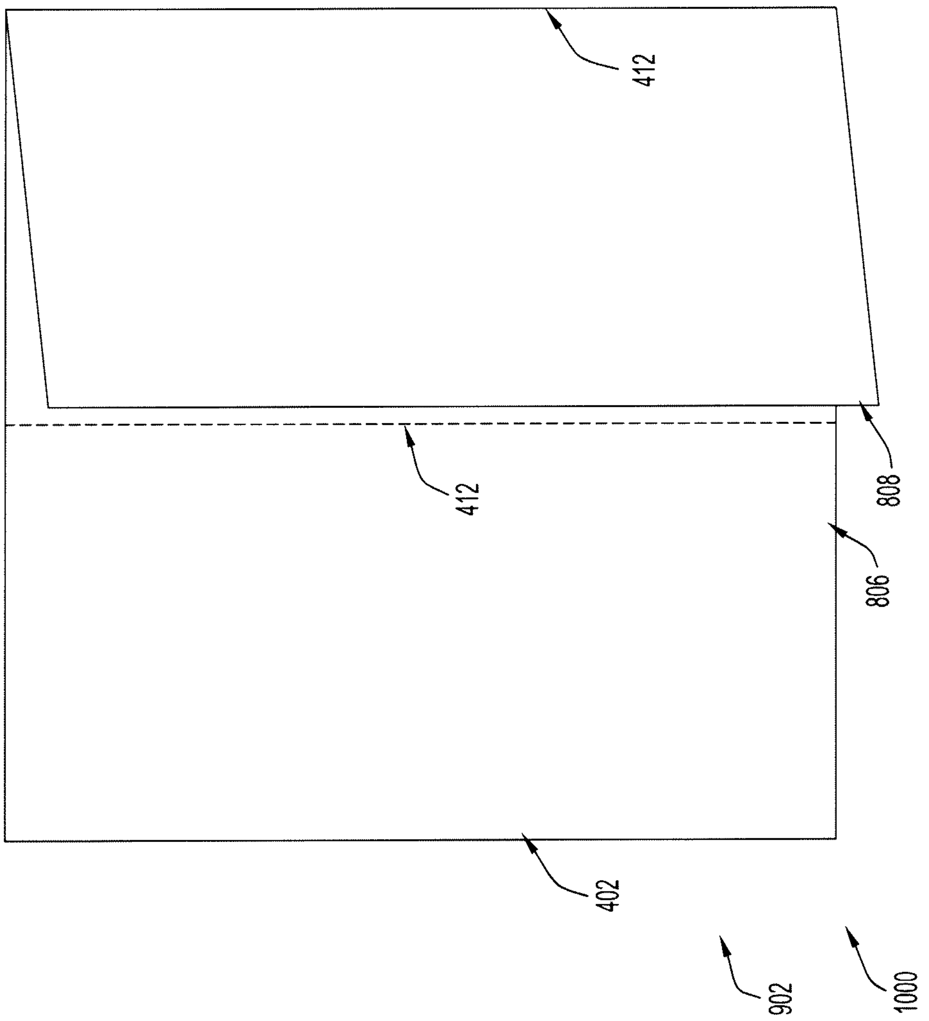
FIG. 10 is an illustration of the alternate exemplary hair extension kit from an alternate view.

FIG. 10 is an illustration 1000 of the hair extension kit 902 from an alternate view. The hair extension kit 902 includes the support backing 402 and the two folds 412. In this view, however, the support backing 402 has been bent along one of the folds 412 to illustrate the front side 806 and the back side 808 of the support backing 402. This view also illustrates how one portion of the support backing 402 may fold over to cover another portion of the support backing 402.

Figure 11:
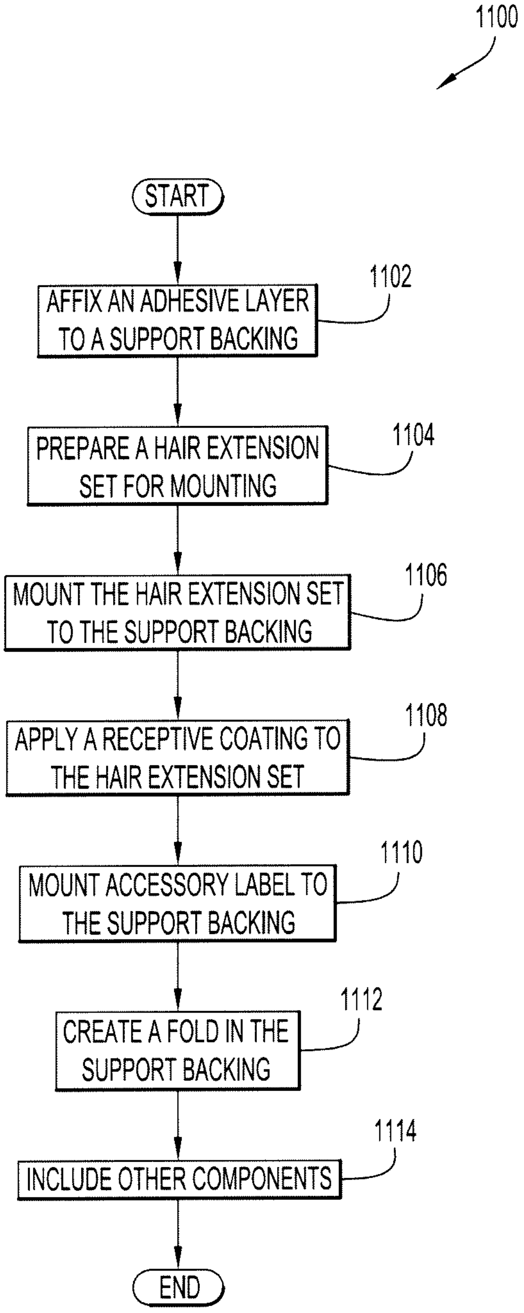
FIG. 11 is a flowchart of an exemplary process for manufacturing a hair extension kit.

FIG. 11 is a flowchart 1100 of an exemplary process for manufacturing a hair extension kit. The process in this embodiment includes affixing an adhesive layer 406 to a support backing 402 (1102). A hair extension set 404 is prepared for mounting (1104). The hair extension set 404 is mounted to the support backing 402 (1106). A receptive coating is applied to the hair extension set (1108). The receptive coating may aid in keeping the individual hair fibers 104 arranged in a single layer. The receptive coating may be a hair spray-like substance and may be applied by spraying it on or by painting it on with a brush. One or more hair fastener accessory labels 508 are mounted to the support backing 402 (1110). The labels 508 may be mounted to a different portion of the support backing 402 than the hair extension set 404. One or more folds 412 are created in the support backing 402 (1112). Alternatively, the support backing 402 may come pre-folded. Other components are included with the mounted support backing 402 (1114).

Figure 12:
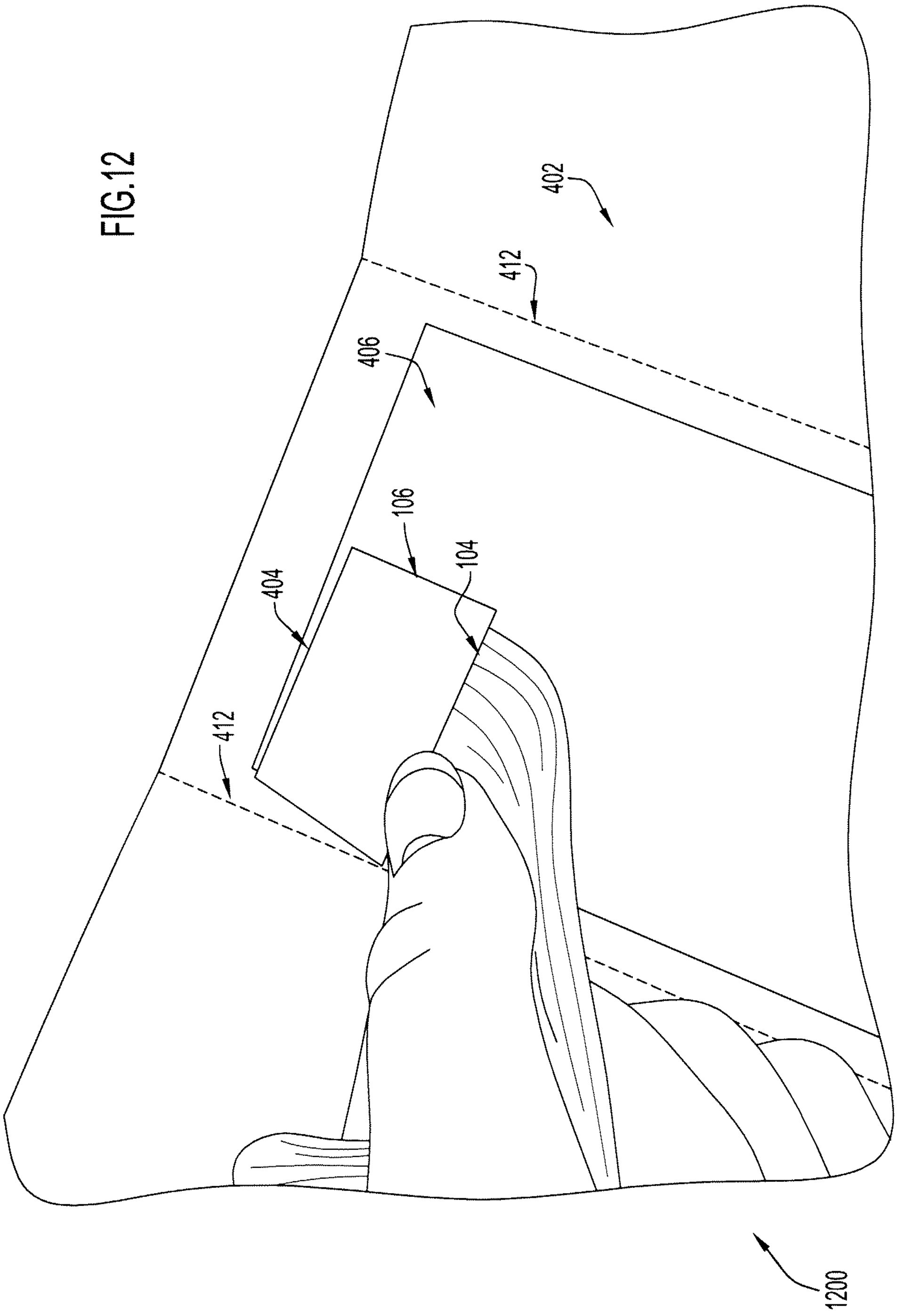
FIG. 12 is a photograph of an exemplary early stage of mounting a hair extension set to a support backing.

FIG. 12 is a photograph 1200 of an early stage of mounting a hair extension set 404 to a support backing 402 according to one embodiment. The photograph 1200 shows the support backing 402 with two folds 412 and a single adhesive layer 406 between the two folds 412. The support member 106 of the hair extension set 404 is being placed onto the adhesive layer 406 while the hair fibers 104 are temporarily being held away from the adhesive layer 406.

Figure 13:
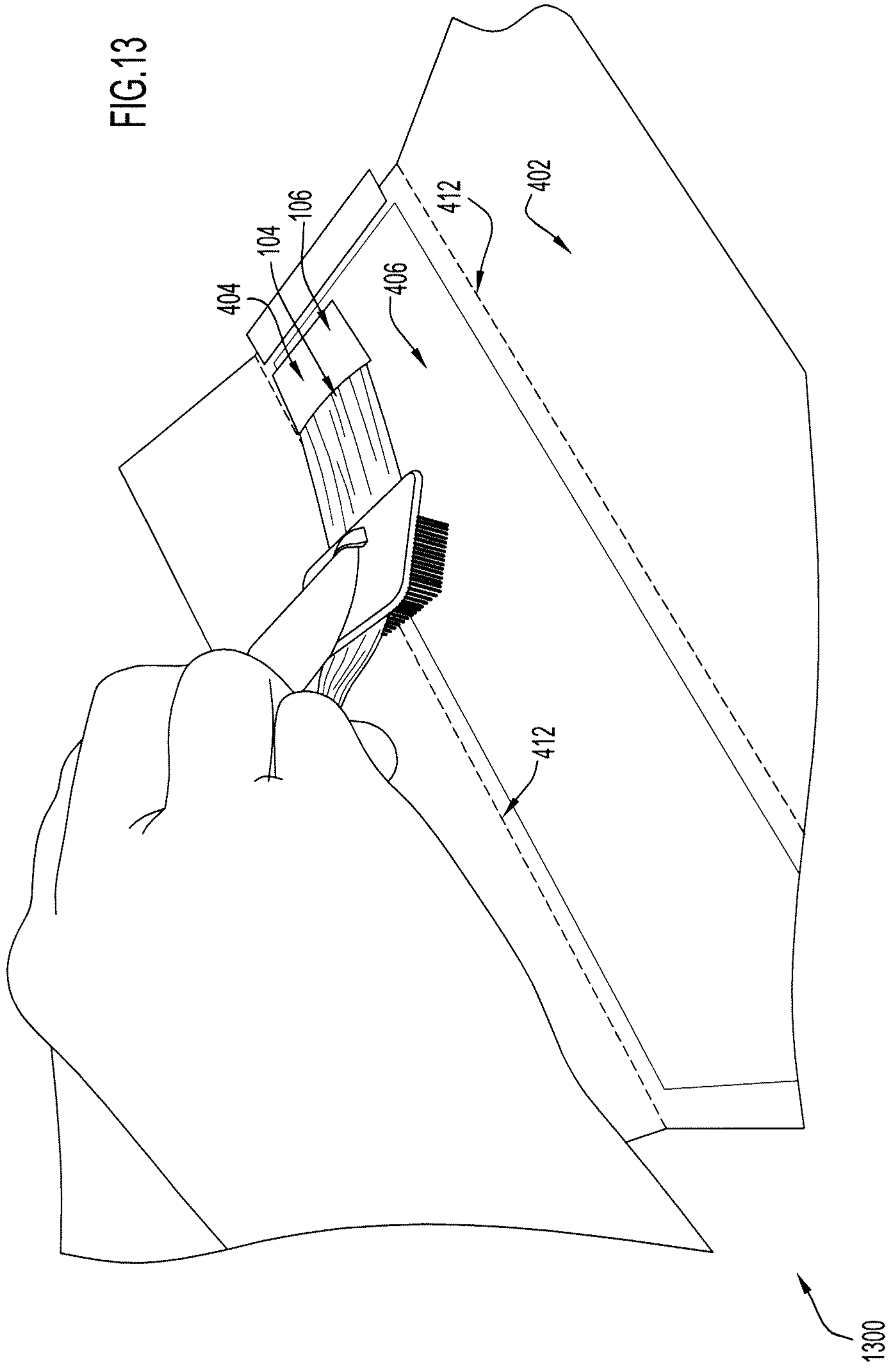
FIG. 13 is a photograph of an exemplary intermediate stage of mounting a hair extension set to a support backing.

FIG. 13 is a photograph 1300 of an intermediate stage of mounting a hair extension set 404 to a support backing 402 according to one embodiment. The support member 106 of the hair extension set 404 has already been temporarily affixed to the adhesive layer 406. A brush- or comb-like device is shown with its teeth or bristles being run through the hair fibers 104. The device separates and arranges the individual hair fibers 104 into a single layer.

Figure 14:
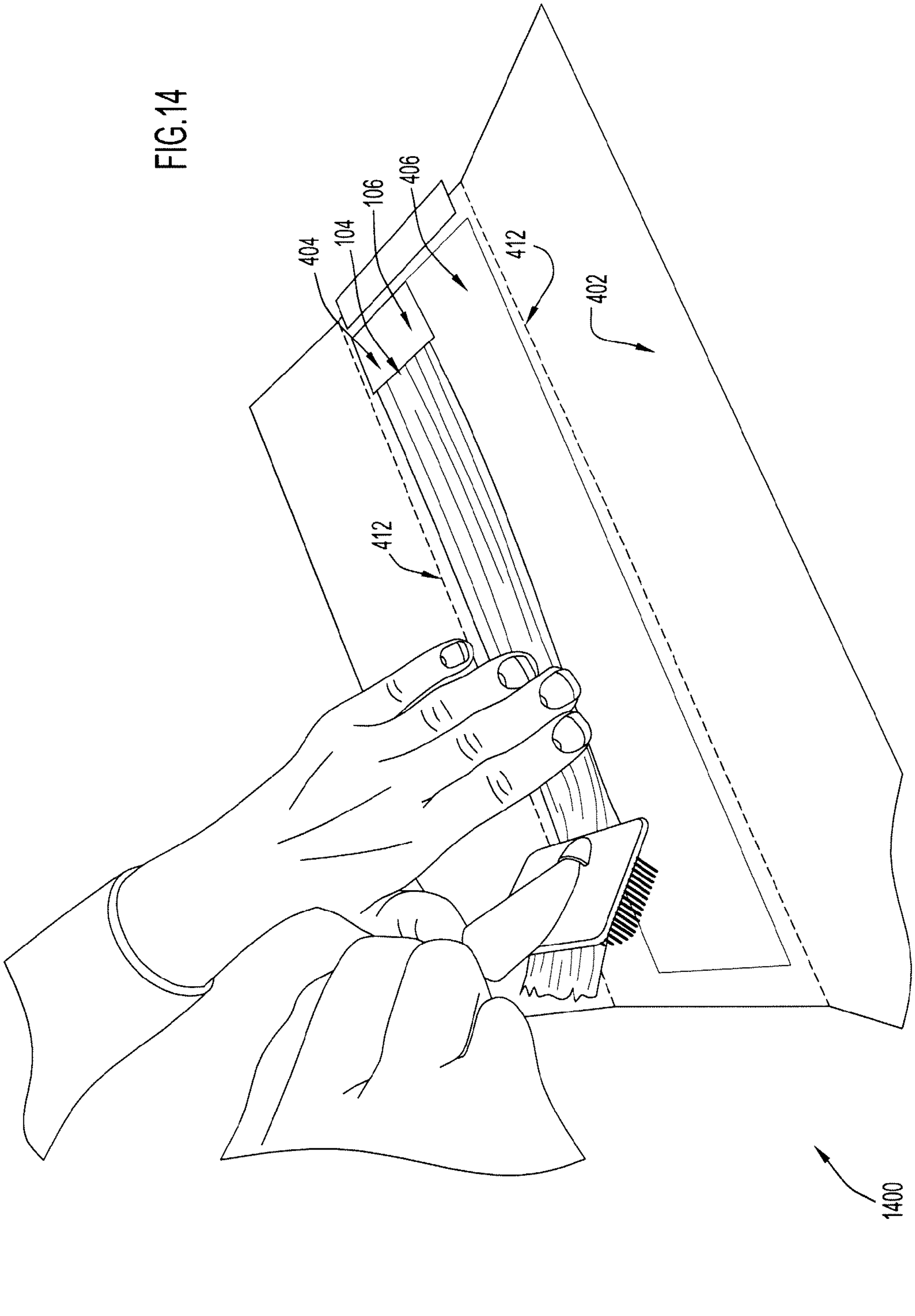
FIG. 14 is a photograph of an exemplary later stage of mounting a hair extension set to a support backing.

FIG. 14 is a photograph 1400 of a later stage of mounting a hair extension set 404 to a support backing 402 according to one embodiment. The single layer of hair fibers 104 have been straightened and temporarily affixed to the adhesive layer 406. The affixing of the hair fibers 104 progressed from near the support member 106 towards the opposite end of the hair fibers 104, with the opposite end of the hair fibers 104 being the last portion of the hair fibers 104 to be affixed.

Figure 15:
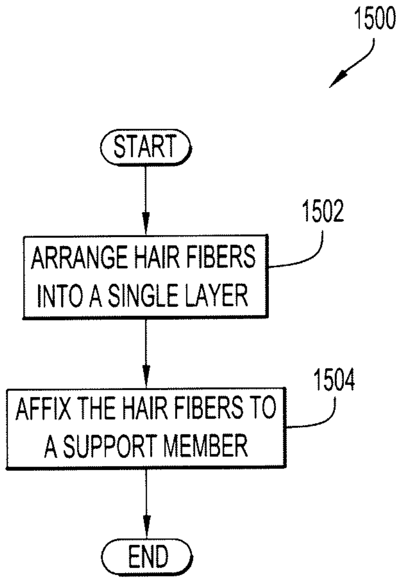
FIG. 15 is a flowchart of an exemplary process of preparing a hair extension set for mounting.

FIG. 15 is a flowchart 1500 of an exemplary process of preparing a hair extension set for mounting. The process in this embodiment includes arranging hair fibers 104 into a single layer (1502). Alternatively, the hair fibers 104 may come pre-arranged in a single layer. For example, they may be pre-attached at one end to a piece of vinyl. The hair fibers 104 are affixed to a support member 106 (1504). The hair fibers 104 may be affixed through an adhesive, such as the adhesive on a piece of tape, or physically, such as through stitching or heat-searing, or a combination of the two.

Figure 16:
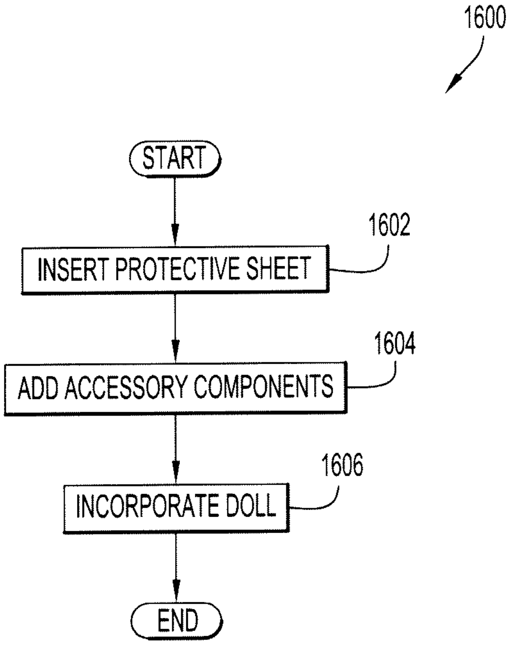
FIG. 16 is a flowchart of an exemplary process of including other components with a hair extension kit.

FIG. 16 is a flowchart 1600 of an exemplary process of including other components with a hair extension kit. The process in this embodiment includes inserting a protective sheet 804 (1602). The protective sheet 804 may be inserted within a folded support backing 402. Accessory components are added (1604). The accessory components may include one or more hair fasteners 504 and/or one or more hair fastener accessory bases 506. A doll is incorporated (1606). The doll packaged along with the other components may add value by providing an immediate item with which the hair extensions may be used.

Figure 17:
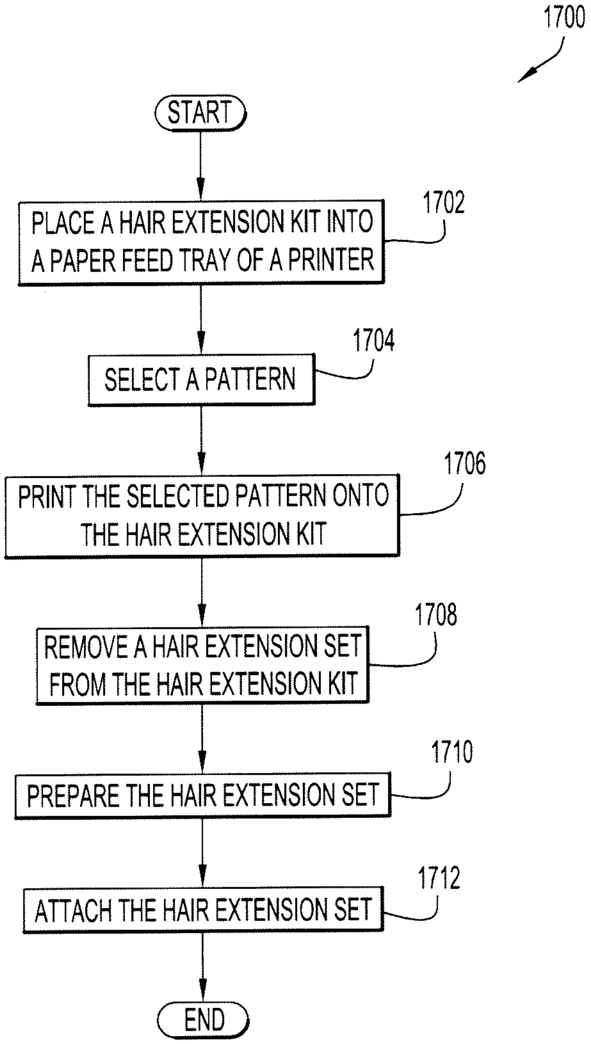
FIG. 17 is a flowchart of an exemplary process of customizing a hair extension kit.

FIG. 17 is a flowchart 1700 of an exemplary process of customizing a hair extension kit. The process includes placing a hair extension kit into a paper feed tray of a printer (1702). The hair extension kit may be any of the hair extension kits described above. The printer may be an inkjet printer similar to ones that are available in many households today.

A pattern is selected (1704). A user of the printer or an end consumer may select the pattern. The pattern may be selected using a computer terminal, such as a laptop or a desktop computer, a tablet computer, such as an IPAD from APPLE, a smartphone, such as a BLACKBERRY from RESEARCH IN MOTION, or a digital camera, for example. A software program used for selecting the pattern may be stored in local memory, such as on a hard drive, compact disc (CD), or digital versatile disc (DVD), or it may be accessed through a network, such as the Internet. In one embodiment, the software selection program runs on an internet server accessible through selecting or typing in an appropriate uniform resource locator (URL) with a web browser program connected to the World Wide Web. The pattern may be selected from a collection of previously organized patterns, such as from a catalog. Alternatively, the pattern may be uploaded or otherwise made available to the program from a source designated by the user or end consumer. For example, the pattern may be a photograph of a pet dog made available from a digital camera, downloaded to a local hard drive, and then uploaded to an internet server.

A different pattern may be selected for each individual hair extension set in the hair extension kit. More than one pattern may be selected for each individual hair extension set in the hair extension kit. For example, a background pattern of purple with pink polka dots, a foreground pattern of red lips, and a text entered by the end consumer reading "HOT STUFF" may be selected as the overall pattern for a single hair extension set. In another embodiment, one or more patterns may be selected for printing onto one or more hair fastener accessory labels included with the hair extension kit. Each pattern for the hair fastener accessory labels may be selected in a similar fashion to the selection for the hair extension sets.

The selected pattern is printed onto the hair extension kit (1706). The hair extension kit may be "customized" by the printed pattern selected by the end consumer. The customization in this manner utilizes off-the-shelf and commonly available equipment. The process of customization does not require specialized dyes or equipment and is accessible for consumers of a younger demographic.

The hair extension set is removed from the hair extension kit (1708). The removal may be as simple as grabbing one edge or corner of the hair extension set and peeling the hair extension set off a light adhesive layer and away from a support backing. At this point, the support backing may be finished protecting the hair extension set through transport, delivery, and processing.

The hair extension set is prepared (1710). The preparation may include attaching the hair extension set to a hair fastener. A hair fastener accessory base may also be attached to the hair fastener. An adhesive sticker from a hair fastener accessory label with a selected pattern may be attached to the hair fastener accessory base for further decoration and customization of the hair extension. The hair extension set is attached (1712). The set may be used to accessorize a girl's hair, a doll's hair, or a pet, for example.

Each of the steps in the various processes above may be optional and/or may be performed in a different order than that described above without deviating from the present invention.

Figure 18:
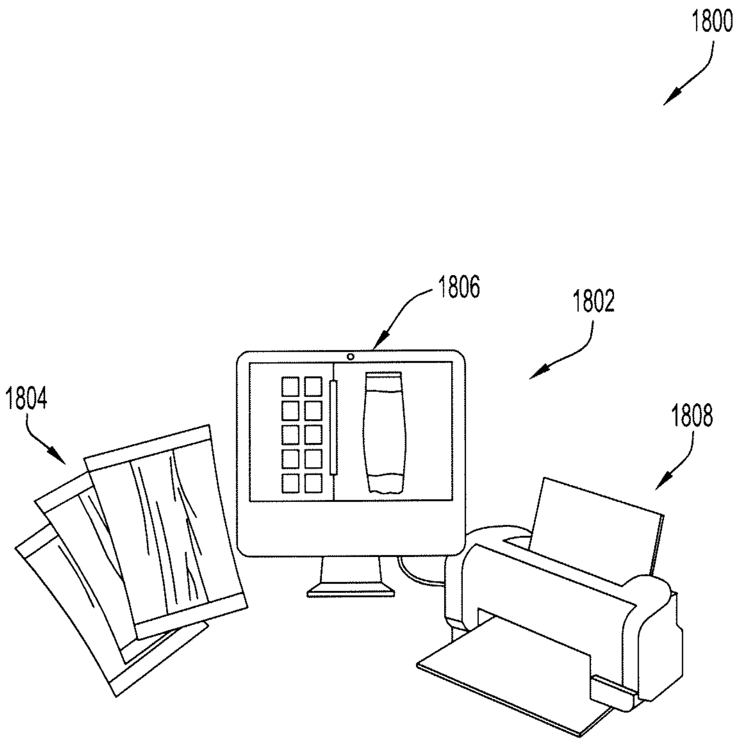
FIG. 18 is an illustration of an exemplary system for customizing a hair extension kit.

FIG. 18 is an illustration 1800 of an exemplary system 1802 for customizing a hair extension kit. The system 1802 in this embodiment includes one or more hair extension kits 1804, a computer 1806 with a display, and an inkjet printer 1808. The computer 1806 may be operably connected to the printer 1808, as well as operably connected to software for selecting a pattern for the hair extension set 1804.

Figure 19:
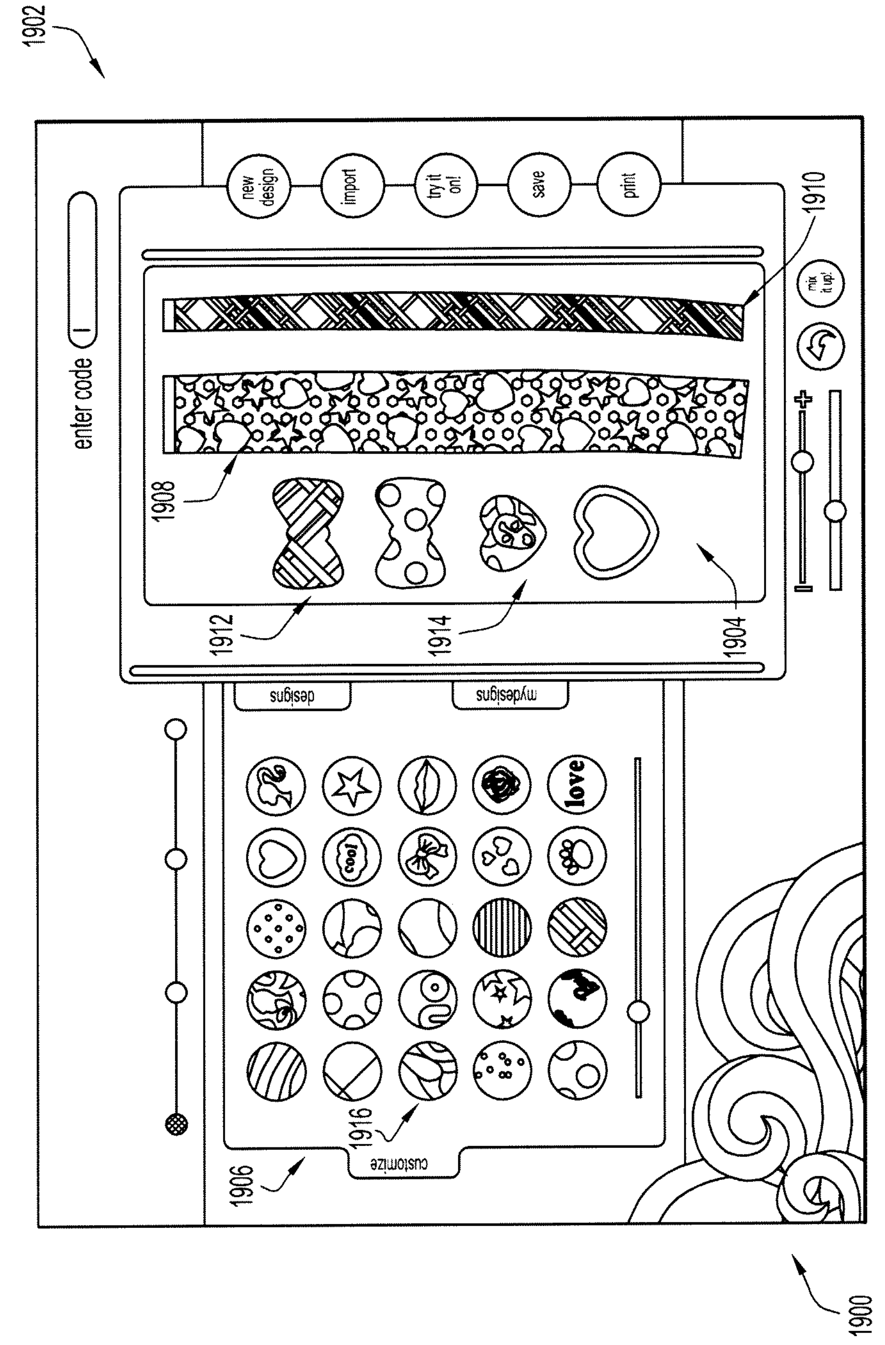
FIG. 19 is an illustration of an exemplary graphical user interface for customizing a hair extension kit.

FIG. 19 is an illustration 1900 of an exemplary graphical user interface (GUI) 1902 for customizing a hair extension kit. The GUI 1902 in this embodiment includes a customization area 1904 and a pattern selection area 1906. A user may have the option of selecting which customization area 1904 more accurately reflects the layout of a hair extension kit that they may possess. The GUI 1902 may then display the selected customization area 1904. In this embodiment, the GUI 1902 displays a customization area 1904 that includes representations of a hair extension set 1908, a narrower hair extension set 1910, two bowtie-shaped labels 1912, and two heart-shaped labels 1914. The customization area 1904 may be initially presented without any patterns present.

The pattern selection area 1904 contains one or more patterns 1916 that may be used to customize the hair extension kit. The patterns 1916 may be displayed as preview icons which aid the selection process by providing the user with an idea of how each overall pattern appears. The patterns 1916 in the pattern selection area 1906 may be pre-selected by the software provider, or one or more patterns 1916 may have been uploaded or otherwise made available to the software program by the user or a third party.

The user may select a pattern 1916 from the pattern selection area 1906 and choose to apply that pattern to one of the representations 1908, 1910, 1912, 1914 in the customization area 1904. The selection may occur by clicking and dragging one of the patterns 1916 to one of the representations 1908, 1910, 1912, 1914. Alternatively, the selection may occur by first clicking on one of the patterns 1916 and then clicking on one of the representations 1908, 1910, 1912, 1914, or vice versa. For example, a user may first click on a pattern with pink hearts, and then click on a representation of a hair extension. The GUI 1904 may then display the hair extension representation overlaid with the pattern of pink hearts.

The GUI 1904 may also provide user with access to other tools to aid in the pattern selection process. For example, the GUI 1904 may provide a tool where the user can design their own custom pattern and add it to the pattern selection area 1906, import a pattern from a selected location, and save their selected patterns. The GUI 1904 may also provide a tool where the user can upload an image of themselves, which they may then use to preview how the customized hair extension sets would appear on them.

Figure 20:
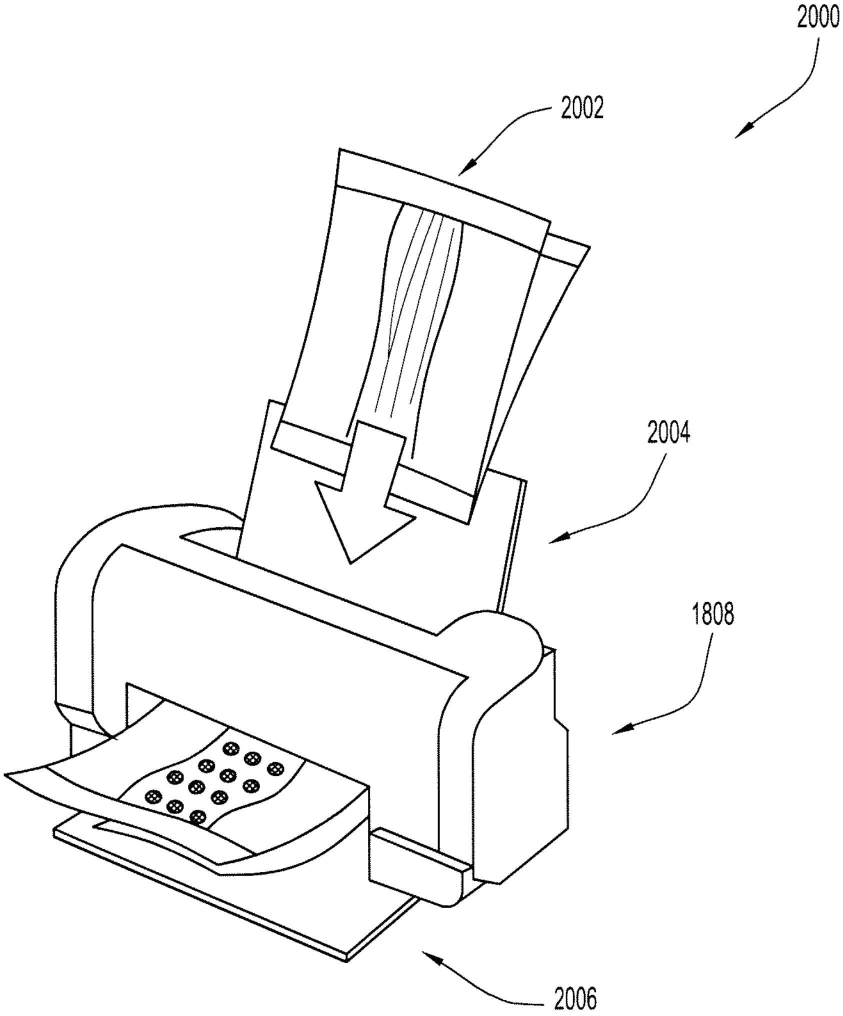
FIG. 20 is an illustration of an exemplary method of printing a selected pattern onto a hair extension kit.

FIG. 20 is an illustration 2000 of an exemplary method of printing a selected pattern onto a hair extension kit. The illustration 2000 shows a hair extension kit 2002 being fed into a paper tray feed 2004 of an inkjet printer 1808. The hair extension kit 2002 appears coming out of the printer 1808 and onto the output tray 2006 of the printer 1808 with a colorful pattern having been printed onto the hair extension set.

Figure 21:
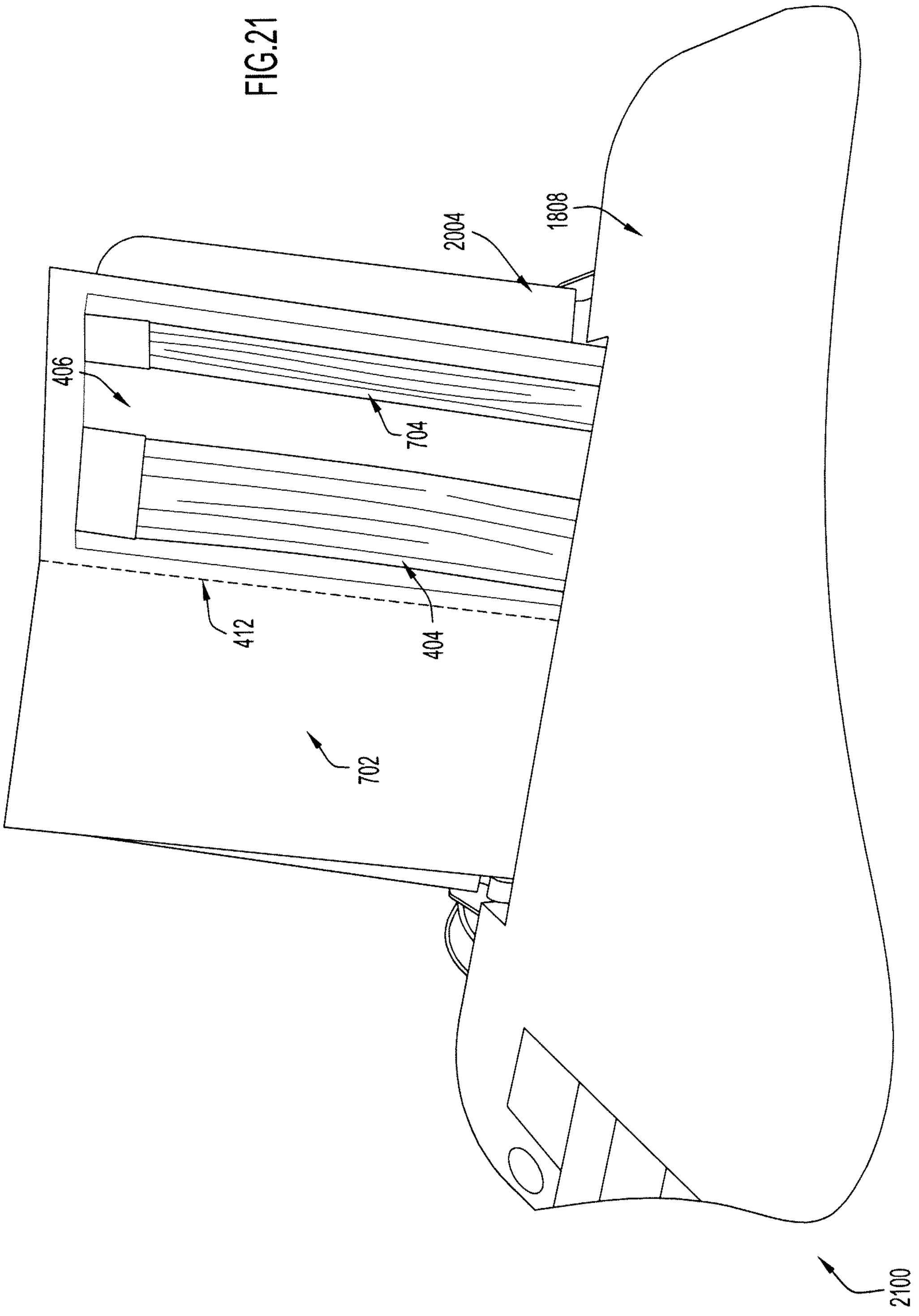
FIG. 21 is a photograph of an exemplary early stage of printing a selected pattern onto a hair extension kit.

FIG. 21 is a photograph 2100 of an early stage of printing a selected pattern onto a hair extension kit according to one embodiment of the present invention. The photograph 2100 shows a hair extension kit 702 with a hair extension set 404 and a narrower hair extension set 704. The hair extension kit 702 is sitting in a paper tray feed 2004 of an inkjet printer 1808. Also visible is the fold 412 in the hair extension kit 2102.

Figure 22:
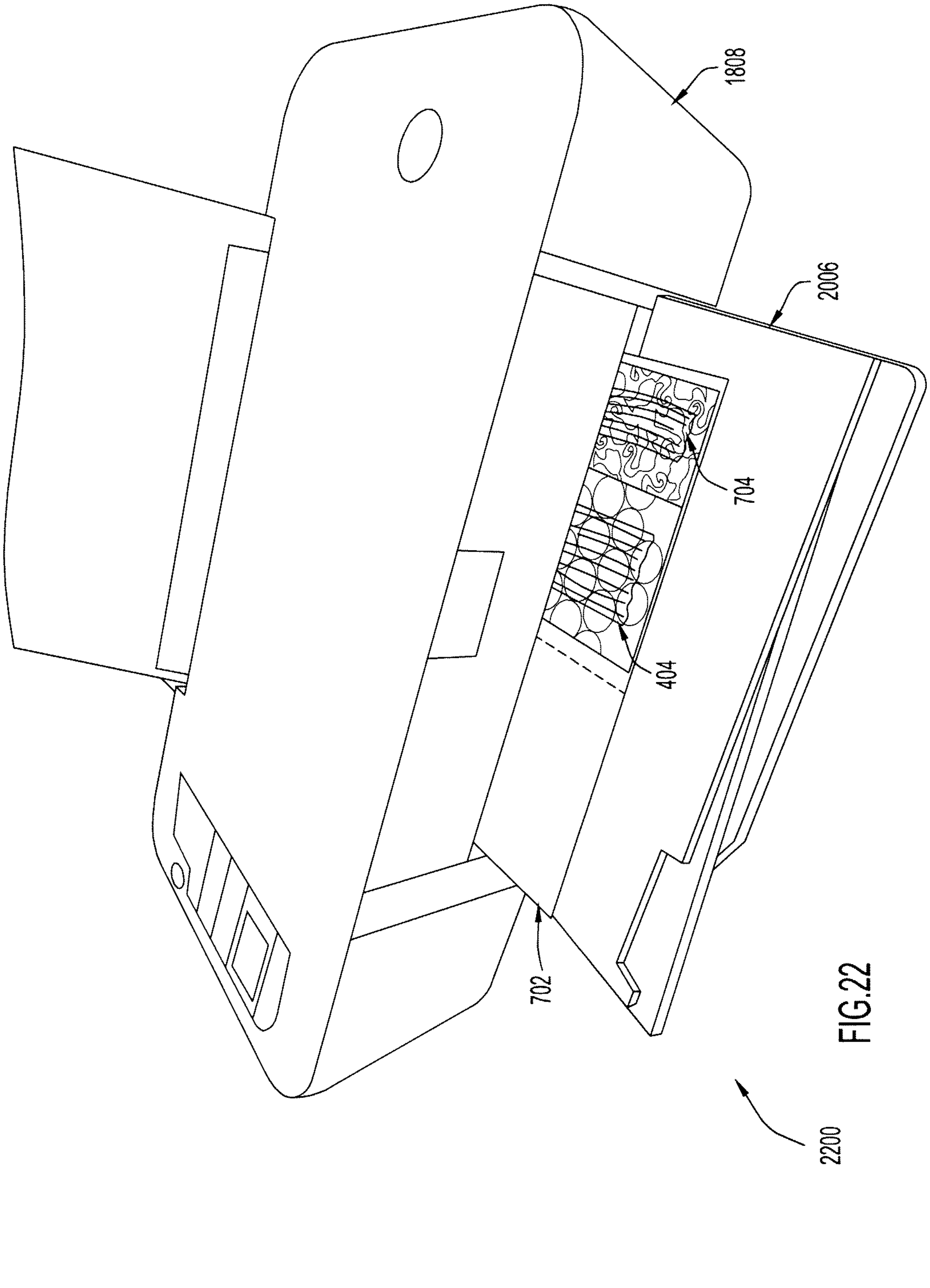
FIG. 22 is a photograph of an exemplary intermediate stage of printing a selected pattern onto a hair extension kit.

FIG. 22 is a photograph 2200 of an intermediate stage of printing a selected pattern onto a hair extension kit according to one embodiment of the present invention. The photograph 2200 shows a hair extension kit 702 with a hair extension set 404 and a narrower hair extension set 704. The hair extension kit 702 is coming out of the printer 1808 onto an output tray 2006. The hair extension set 404 and the narrower hair extension set 704 have different patterns that have been printed onto them. In one embodiment, the hair extension set 404 may be coated with a gel containing one or more water-soluble resins. The water-soluble resin may aid in adhering ink from the printer 1808 to the hair fibers because the ink may penetrate into the surface of the water-soluble resin, where the hair fibers alone may be more resistant to ink penetration. Examples of usable water-soluble resins include polyvinyl acetate (PVA) and polyvinylpyrrolidone (PVP).

Figure 23:
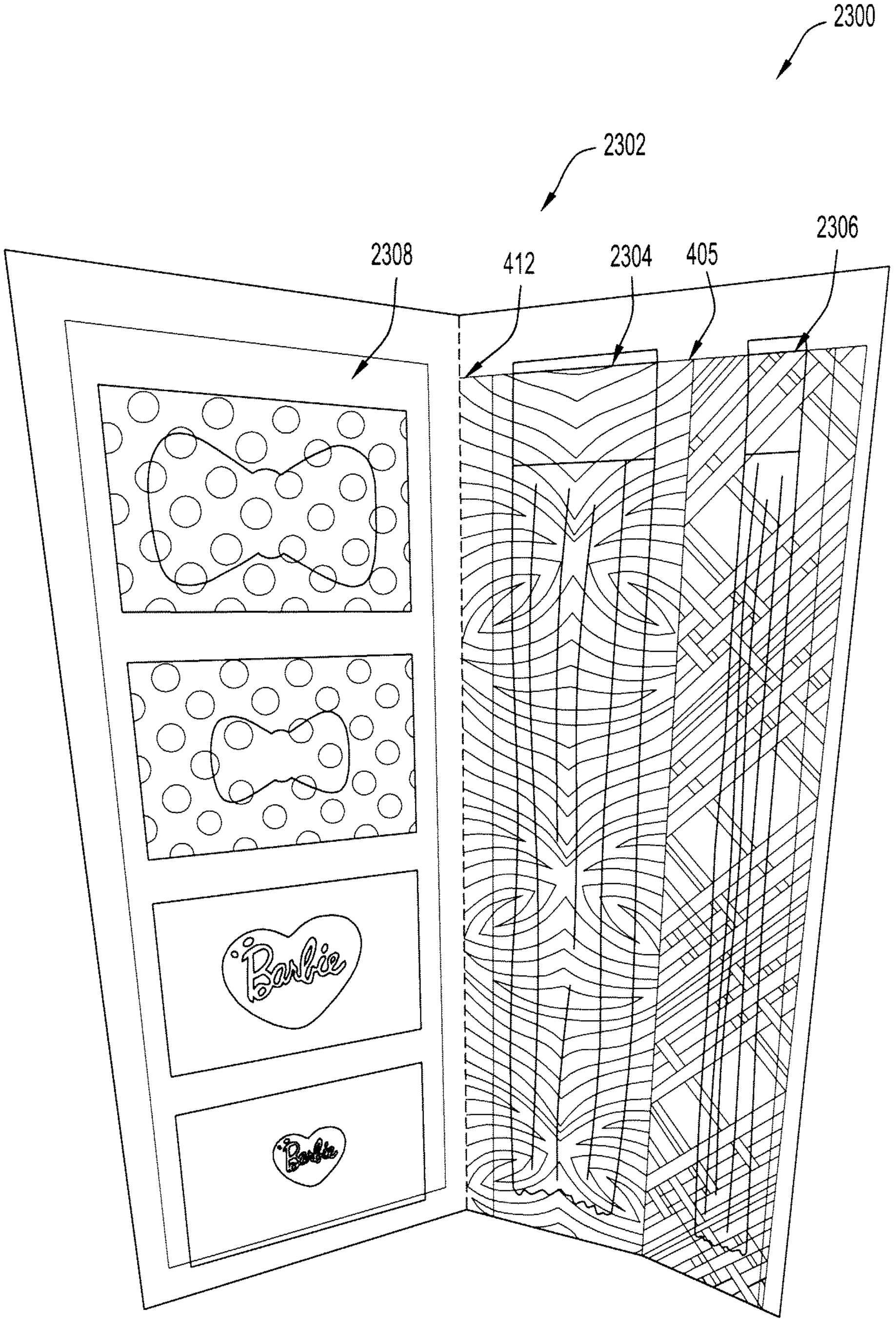
FIG. 23 is a photograph of an exemplary customized hair extension kit.

FIG. 23 is a photograph 2300 of a customized hair extension kit 2302 according to one embodiment of the present invention. The customized hair extension kit 2302 includes a hair extension set 2304 with a first printed pattern, a narrower hair extension set 2306 with a second printed pattern, and a set of hair fastener accessory labels 2308 with different sized and different shaped stickers with different patterns printed on the labels.

Figure 24:
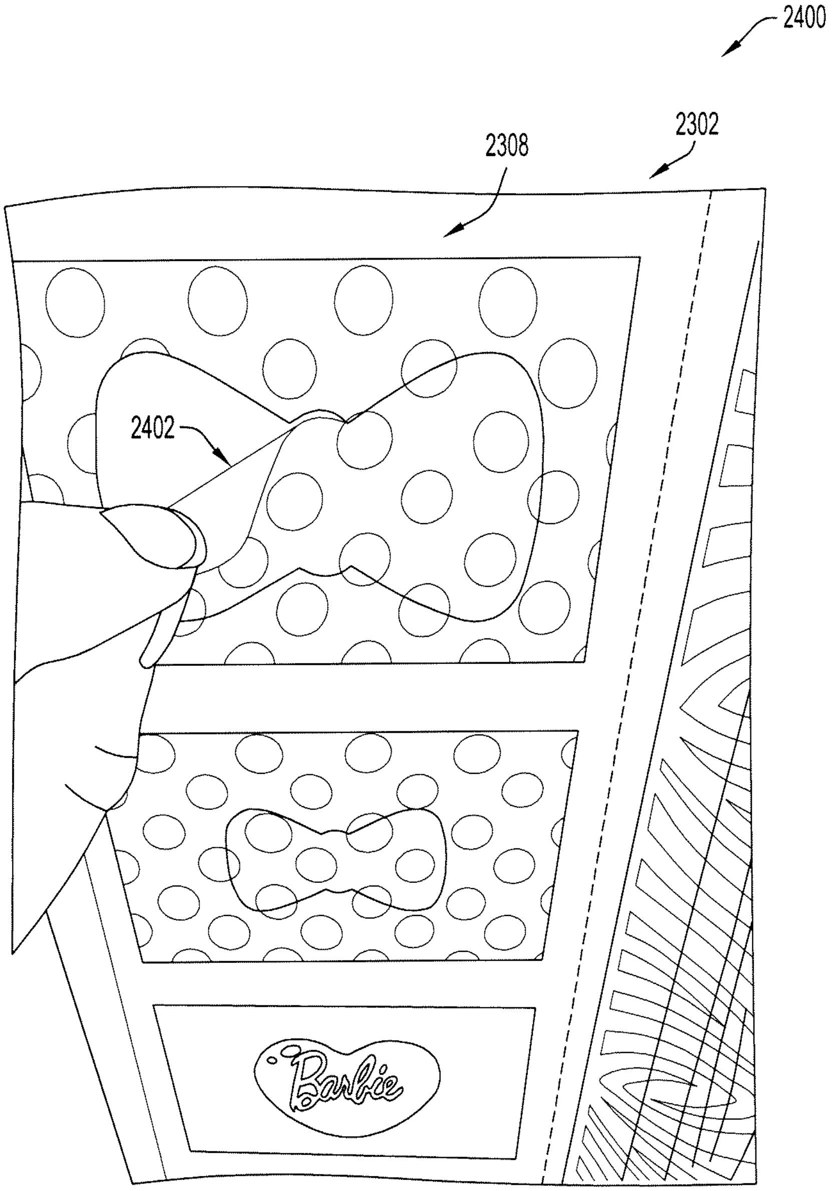
FIG. 24 is a photograph of the hair fastener accessory labels on an exemplary customized hair extension kit.

FIG. 24 is a photograph 2400 of the hair fastener accessory labels 2308 on a customized hair extension kit 2302 according to one embodiment of the present invention. An adhesive sticker 2402 with a printed pattern is shown in the process of being removed from the label 2308. The adhesive sticker 2402 may be attached to, e.g. a hair fastener accessory base.

Figure 25:
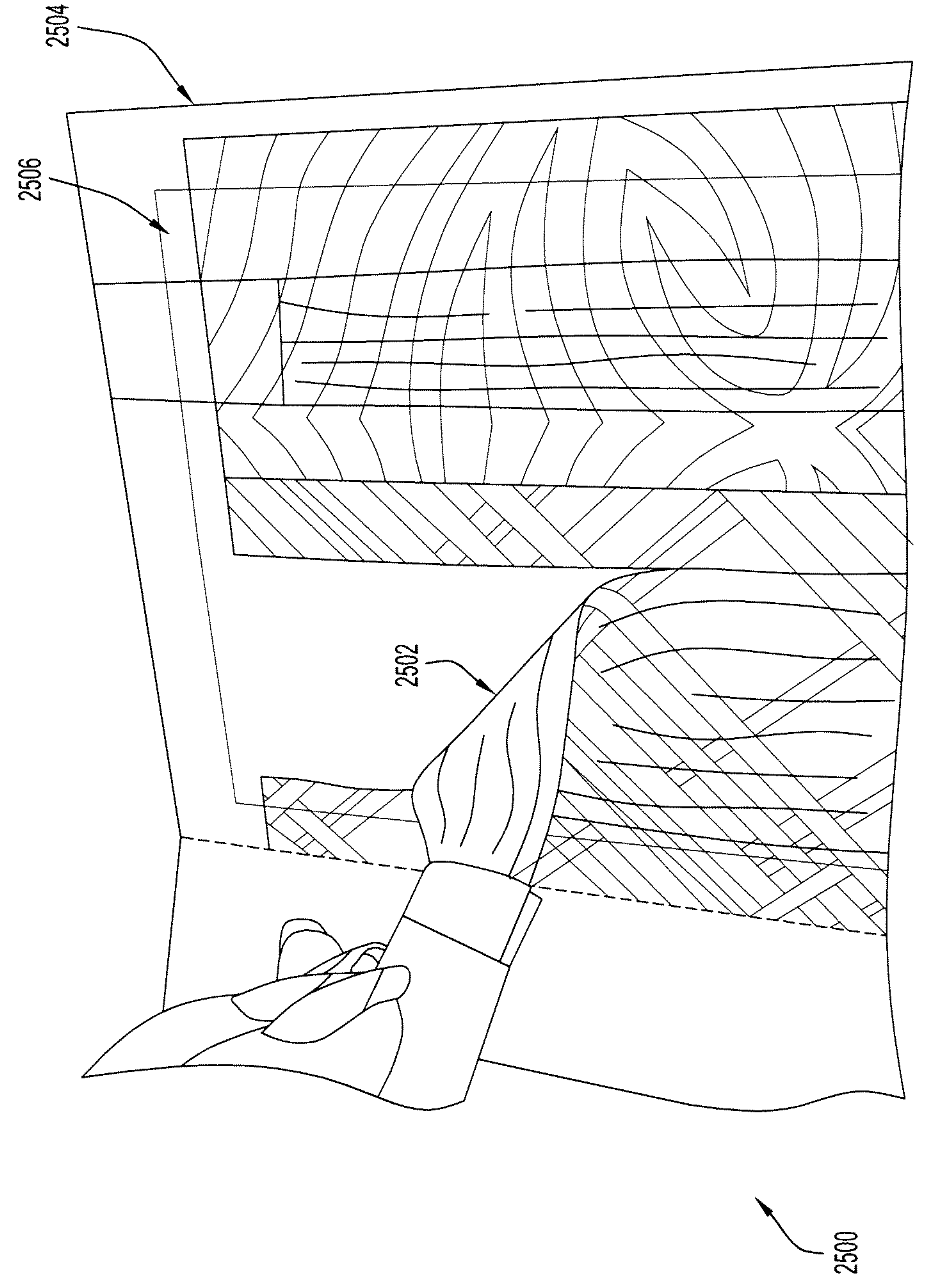
FIG. 25 is a photograph of a customized hair extension set being removed from a hair extension kit.

FIG. 25 is a photograph 2500 of a customized hair extension set 2502 being removed from a hair extension kit 2504 according to one embodiment of the present invention. The customized hair extension set 2502 is shown being peeled away from an adhesive layer 2506 of the hair extension kit 2504. A printed pattern remains visible on the customized hair extension set 2502 as it is peeled away.

Figure 26:
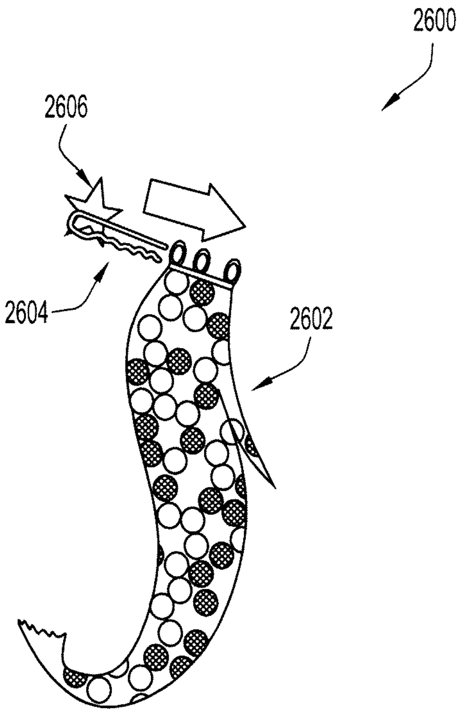
FIG. 26 is an illustration of a customized hair extension set being prepared for attachment.

FIG. 26 is an illustration 2600 of a customized hair extension set 2602 being prepared for attachment according to one embodiment of the present invention. A hair fastener 2604 is shown being attached to the customized hair extension set 2602. In this embodiment, the hair fastener 2604 is a bobby pin and the customized hair extension set 2602 includes loops that receive the bobby pin. A hair fastener accessory base 2606 in the shape of a star is attached to the hair fastener 2604 to provide further customization and decoration.

Figure 27:
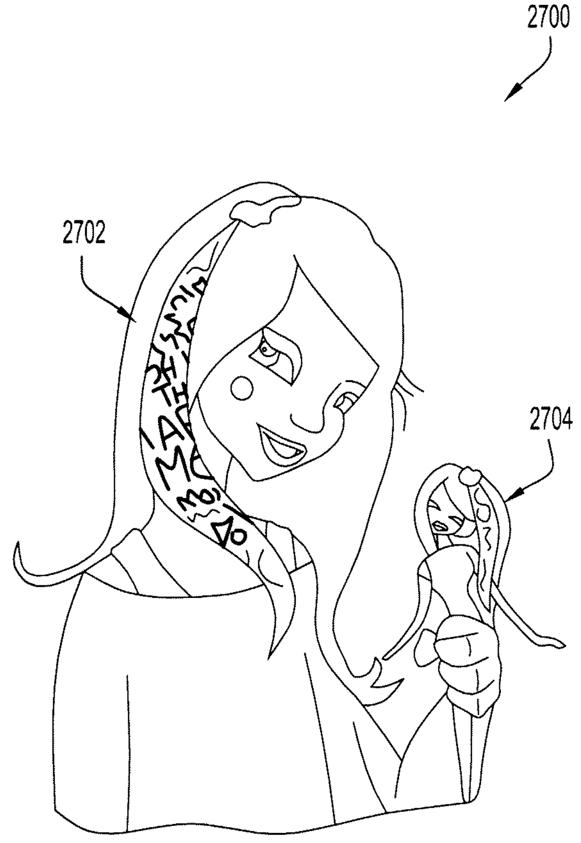
FIG. 27 is an illustration of an exemplary attached customized hair extension set.

FIG. 27 is an illustration 2700 of an attached customized hair extension set according to one embodiment of the present invention. The illustration 2700 shows a customized hair extension set 2702 as attached to a girl's hair. A smaller customized hair extension 2704 is attached to a doll's hair.

Figure 28:
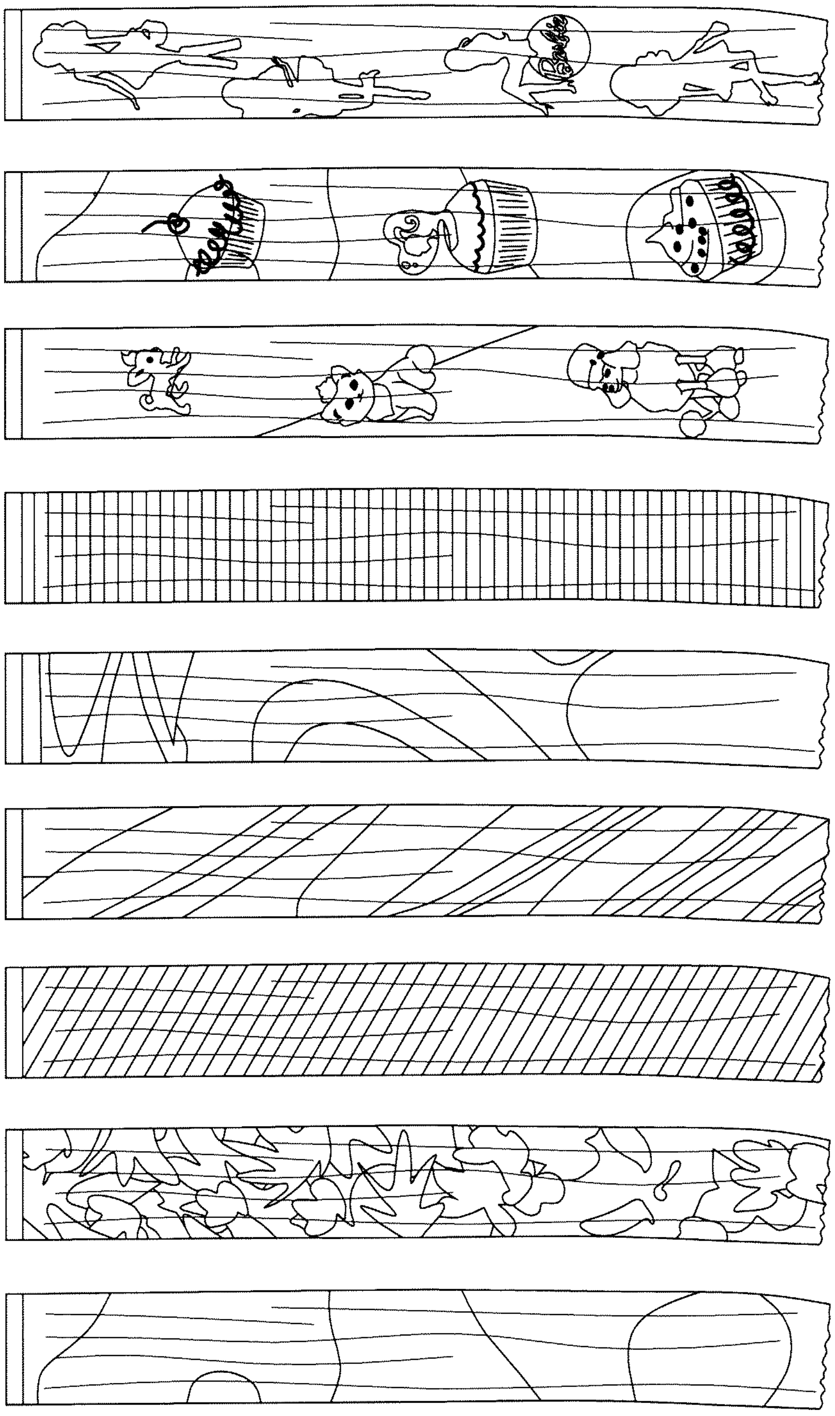
FIG. 28 is a first set of exemplary patterns as illustrated on representations of customized hair extension sets.
Figure 29:
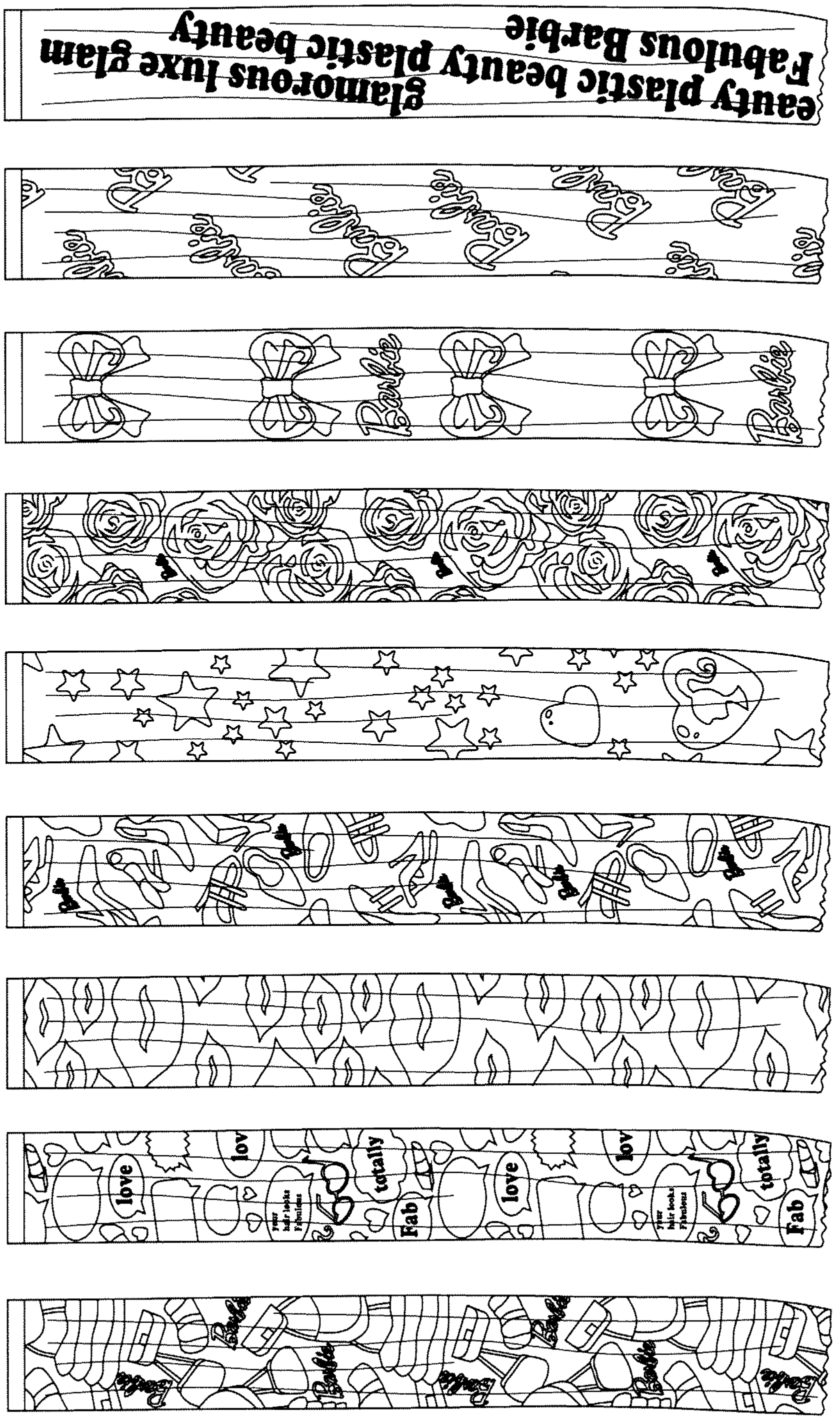
FIG. 29 is a second set of exemplary patterns as illustrated on representations of customized hair extension sets.

FIGS. 28 and 29 are exemplary patterns as illustrated on representations 2800, 2900 of customized hair extension sets.

Figure 30:
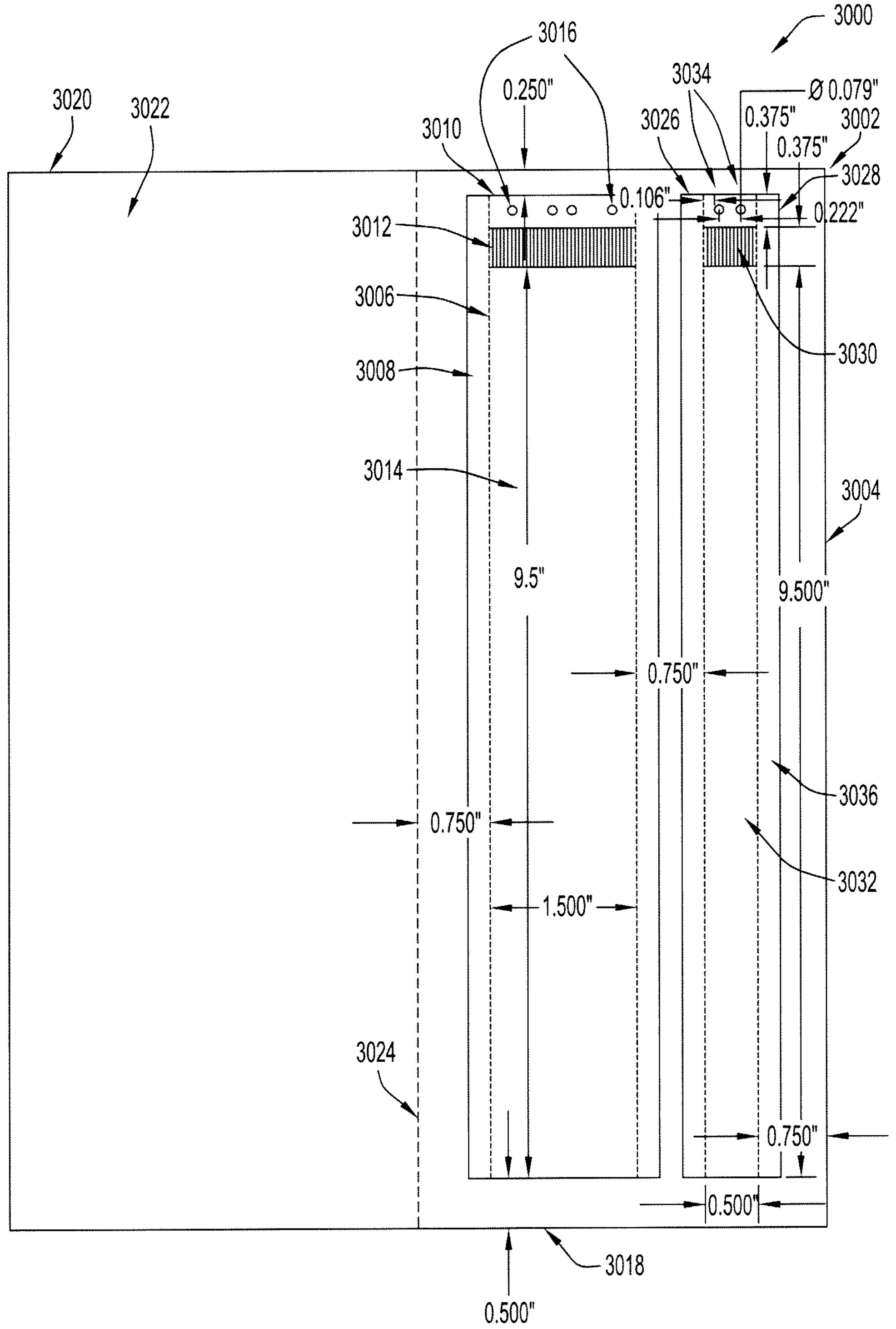
FIG. 30 is an illustration of an eighth embodiment of a hair extension kit.

FIG. 30 is an illustration 3000 of an eighth embodiment of a hair extension kit 3002 according to the present invention. The dimensions and parameters provided in the illustration 3000 are provided as examples. The hair extension kit 3002 includes a support backing 3004 and a hair extension set 3006. The support backing 3004 may be a form of packaging upon which the hair extension set 3006 is transported and distributed. In this illustrative example, the support backing 3004 is one 8.5"×11" sheet of paper stock. In other embodiments, the support backing 3004 may be a sheet of paper stock of another standardized size or of any other suitable material.

The support backing 3004 includes a printer feeding edge 3018 and a top edge 3020. The support backing 3004 may be fed into a printer with the printer feeding edge 3018 being a leading edge into the printer. The top edge 3020 may be opposite the printer feeding edge 3018. The support backing 3004 further includes a printing surface 3022. The printing surface 3022 may be a surface of the support backing 3004 upon which printing ink is first deposited when fed into an active desktop printer. The support backing 3004 further includes a fold 3024. The fold 3024 may permit the support backing 3004 to bend such that a first portion of the support backing 3004 covers a second portion of the support backing 3004. In this example, the fold 3024 is positioned such that the left half may fold over and cover the right half, or vice versa.

The hair extension set 3006 may be removably attached to the printing surface 3022 on the support backing 3004. In this illustrative example, the means of attachment is an adhesive layer 3008. The adhesive layer 3008 temporarily and/or removably affixes the hair extension set 3006 to the support backing 3004 through transport, delivery, and further processing until an end consumer voluntarily separates the hair extension set 3006 from the support backing 3004. The adhesive layer 3008 in this example has been sized to better conform with the dimensions of the hair extension set 3006.

The hair extension set 3006 includes a clip attachment portion 3010, a reinforcement portion 3012, and a hair fiber portion 3014. The clip attachment portion 3010 may be a support panel. The clip attachment portion 3010 may be composed of a rigid or semi-rigid material, such as vinyl. The clip attachment portion 3010 may be tear-resistant and capable of supporting the weight of the entire hair extension set 3006. The clip attachment portion 3010 may further include one or more apertures or holes 3016. One or more hair fasteners may attach to the hair extension set 3006 via the holes 3016. The clip attachment portion 3010 may include two sets of holes 3016. A first set of holes may accommodate a smaller hair fastener, such as a clip for a doll, while a second set of holes may accommodate a larger hair fastener, such as a clip for a child.

The reinforcement portion 3012 may attach the hair fiber portion 3014 to the clip attachment portion 3010. The reinforcement portion 3012 may include an adhesive that adheres hair fibers to a panel of vinyl. In some embodiments, the reinforcement panel 3012 includes stitching attaching the hair fibers to a panel of vinyl. The hair fiber portion 3014 may include a plurality of individual hair fibers. Alternatively, the hair fiber portion 3014 may include a plurality of hair fiber bundles. The hair fiber portion 3014 may be a single layer of hair fibers, i.e. a single-ply configuration.

The hair extension kit 3002 further includes a smaller hair extension set 3026. The smaller hair extension set 3026 may have one or more smaller dimensions than the hair extension set 3006. In this embodiment, the smaller hair extension set 3026 has a smaller width than the hair extension set 3006. The smaller hair extension set 3026 includes a clip attachment portion 3028, a reinforcement portion 3030, and a hair fiber portion 3032. The clip attachment portion 3028 may further include one or more apertures or holes 3034. One or more hair fasteners may attach to the smaller hair extension set 3026 via the holes 3034. In this embodiment, the clip attachment portion 3028 includes two holes 3034 that accommodates a smaller clip, such as a clip for a doll. The smaller hair extension set 3026 is temporarily and/or removably attached to the printing surface 3022 of the support backing 3004 by an adhesive layer 3036.

Figure 31:
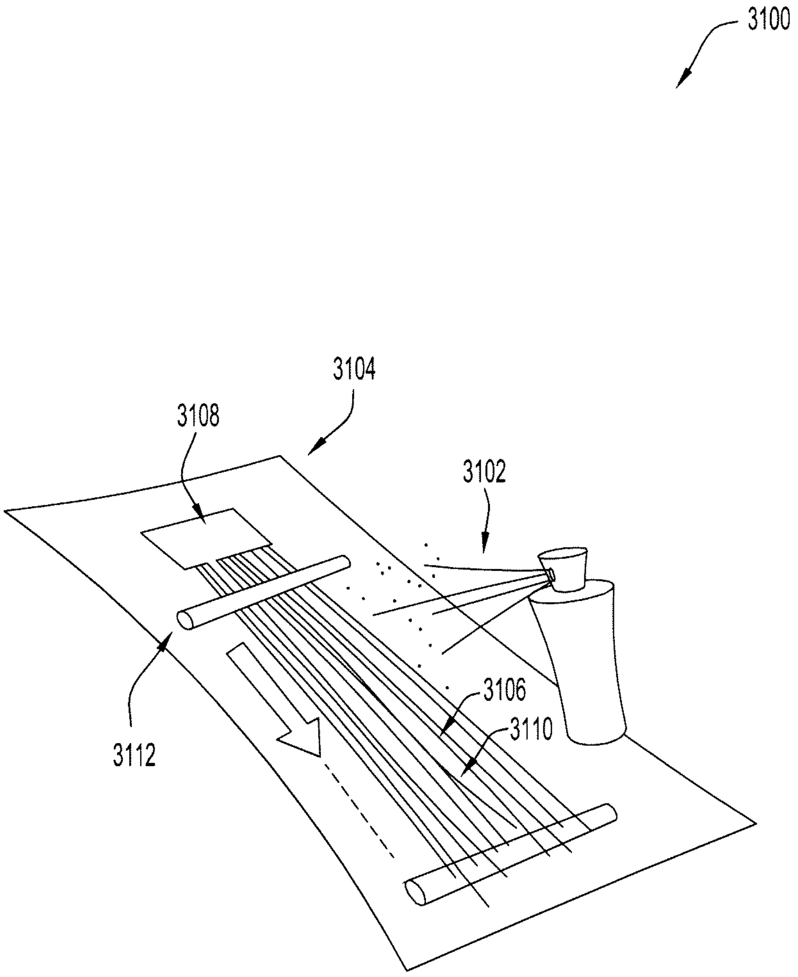
FIG. 31 is an illustration of a step of applying a second adhesive to a hair extension kit to create a second adhesive layer on a hair extension set.

FIG. 31 is an illustration 3100 of a step of applying a receptive coating material 3102 to a hair extension kit 3104 to create a receptive coating layer 3106 on a hair extension set 3108. In some embodiments, applying a receptive coating material 3102 includes spraying the receptive coating material 3102. In other embodiments, applying a receptive coating material 3102 includes brushing the receptive coating material 3102 onto the hair extension set 3108. A smoothing device 3112 may be used to evenly coat the receptive coating material 3102 to the hair extension set 3108.

The receptive coating layer 3106 may aid in keeping individual hair fibers in the hair extension set 3108 arranged in a single layer. The receptive coating material 3102 may be a polymer-based solution containing polyurethane and cellulose binders, which may set and prime the hair for a printing process and for the absorption of printer ink. Such a polymer-based solution may be desirable because it allows the hair to set flat and stationary, and it acts as a substrate for the printing process. Furthermore, the polymer-based solution may provide an absorptive surface to retain the ink on the hair surface. However, any PVP, PVA, PVP/VA, polymer-based or polyurethane-based solutions may be used as the receptive coating material 3102. FIG. 38 is a spreadsheet 3800 with various exemplary formulations of the receptive coating material 3102 in accordance with the present invention. In some embodiments, the receptive coating material 3102 is 79% water, 10% PVP, 0.15% cellulose, 1% preservative, 10% polyurethane and fillers.

A sealant layer 3110 may be separately applied to the hair extension set 3108. The sealant layer 3110 may aid in sealing in inks or dyes that are applied to the hair fibers and/or making the hair fibers more water-resistant. The sealant layer 3110 may be in the form of a wax that is applied from a tube similar to lipstick or lip balm (not shown). The wax may be beeswax and/or ceresine wax, with an emollient oil ester. These particular types of substances are desirable because they create a hydrophobic coat which resists water and preserves the ink design underneath. However, any waxy solid, with an emollient oil ester may be used as the sealant layer 3110. In some embodiments, the wax is 34% ethyl hexyl palmitate, 29% polybutene, 20% ceresine wax, 16% beeswax, 0.50% preservative and 0.50% tocoppheryl acecetate.

Alternatively or additionally, the sealant layer 3110 may be in the form of a chemical sealant. The chemical sealant may be applied to and react with the materials in the receptive coating layer 3106 to seal in inks or dyes and/or make the hair fibers more water-resistant or water-repellant. FIG. 39 is a spreadsheet 3900 with various exemplary formulations of a chemical sealant in accordance with the present invention. Any of the chemical sealants, listed as Formulas 1, 2, and 3 in the spreadsheet 3900, may be applied to the receptive coating materials listed as Formulas F, G, H, I, J, K, L, and M in the spreadsheet 3800 to accelerate a chemical curing process by providing a cross-linking agent. One or more of the materials in the chemical sealants reacts to the resins in the receptive coating materials during this process.

Alternatively, the receptive coating layer 3106 may include both a receptive coating material and a sealant composition. The sealant composition may be one of a hydrophobic lubricant and/or a heat-curable sealant. The hydrophobic lubricant may be a wax, such as beeswax and/or ceresine wax, or an oil. For example, the receptive coating layer 3106 may include both a polymer-based solution and a wax. On the other hand, a heat-curable sealant may trap printer ink when exposed to heat, such as when the receptive coating layer 3106 or the sealant layer 3110 is exposed to a hair dryer or a flat iron. Referring to FIG. 38, a heat-curable sealant may include one or more of the following materials: Bayhydrol XP206, Bayhydrol 124, Joncryl 540, Joncryl 120, Avalure UR405, and Carboset. An adhesive layer with both an adhesive and a sealant may reduce the number of steps in manufacturing, as well as create a water-resistant coating that accepts and retains printer ink.

Figure 32:
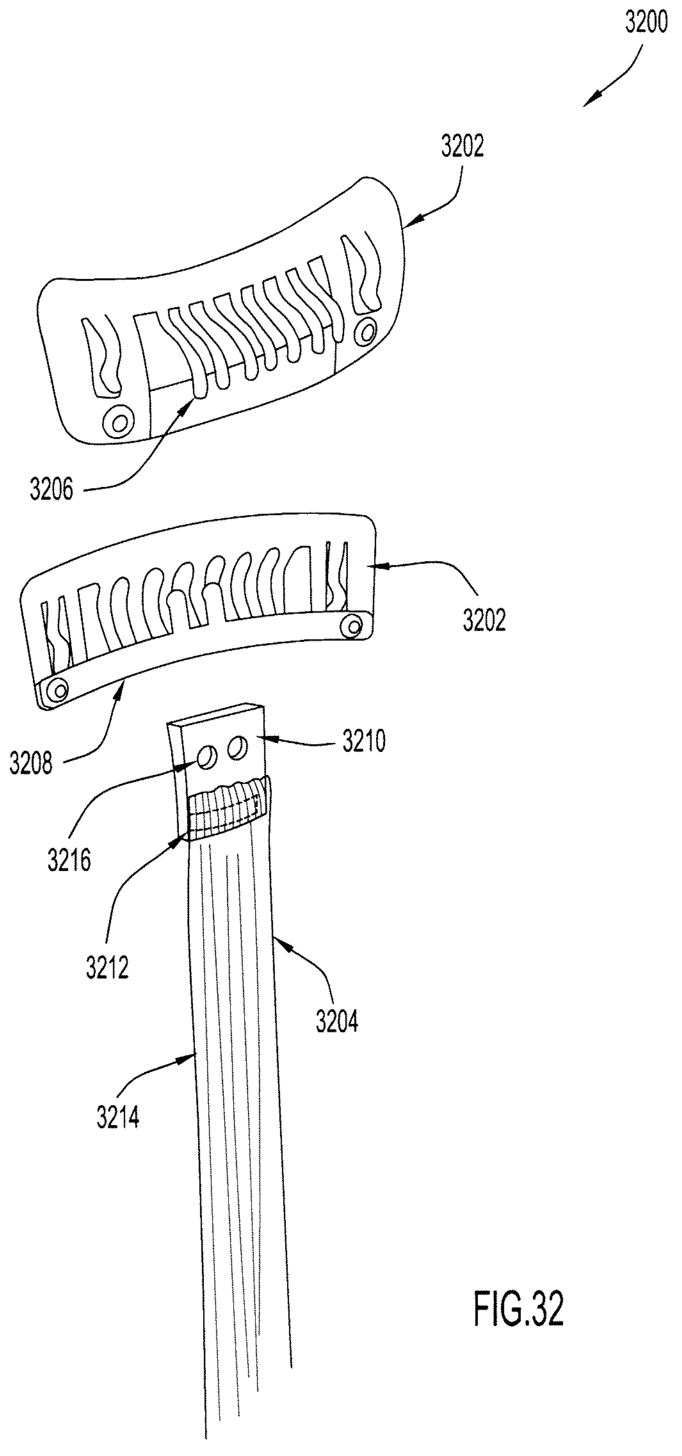
FIG. 32 is an illustration of a first exemplary hair fastener and a hair extension set.

FIG. 32 is an illustration 3200 of a first exemplary hair fastener 3202 and a hair extension set 3204. The hair fastener 3202 includes one or more prongs 3206 and one or more tabs 3208. The illustrated embodiment includes two tabs 3208. The prongs 3206 removably fasten the hair fastener 3202 into a girl's or doll's hair or into a pet's fur.

The hair extension set 3204 includes a clip attachment portion 3210, a reinforcement portion 3212, and a hair fiber portion 3214. The clip attachment portion 3010 may include one or more apertures or holes 3216. The tabs 3208 on the hair fastener 3202 may attach to the holes 3016 in the hair extension set 3204, thus temporarily and/or removably securing the hair extension set 3204 to the hair fastener 3202.

Figure 33:
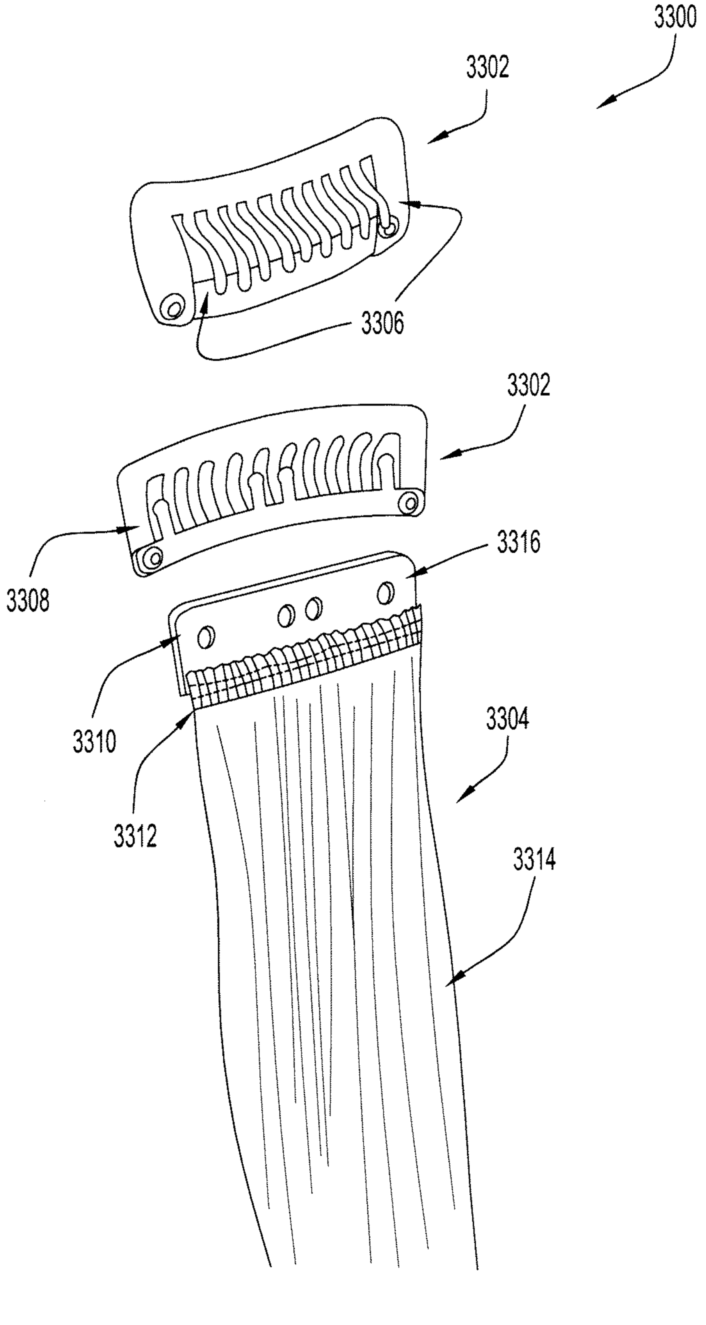
FIG. 33 is an illustration of a second exemplary hair fastener and a hair extension set.

FIG. 33 is an illustration 3300 of a second exemplary hair fastener 3302 and a hair extension set 3304. The hair fastener 3302 includes one or more prongs 3306 and one or more tabs 3308. The illustrated embodiment includes four tabs 3308. The prongs 3306 removably fasten the hair fastener 3302 into a girl's or doll's hair or into a pet's fur.

The hair extension set 3304 includes a clip attachment portion 3310, a reinforcement portion 3312, and a hair fiber portion 3314. The clip attachment portion 3310 may include one or more apertures or holes 3316. The illustrated embodiment includes four holes 3316. The tabs 3308 on the hair fastener 3302 may attach to the holes 3316 in the hair extension set 3304, thus temporarily and/or removably securing the hair extension set 3304 to the hair fastener 3302. The spacing of the tabs 3308 may be such that a larger hair extension set may utilize most or all of the tabs 3308, while a smaller hair extension set may utilize fewer of the tabs 3308. For example, the hair extension set 3304 with four holes 3316 may utilize all four tabs 3308 on the hair fastener 3302, while the hair extension set 3204 with two holes 3216 may utilize only two of the four tabs 3308.

Figure 34:
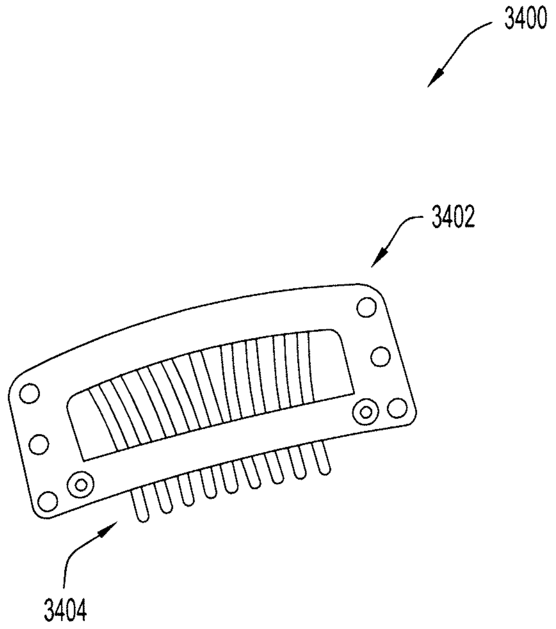
FIG. 34 is a photographic illustration of an exemplary hair fastener.

FIG. 34 is a photographic illustration 3400 of an exemplary hair fastener 3402. The hair fastener 3402 includes one or more prongs 3404.

Figure 35:
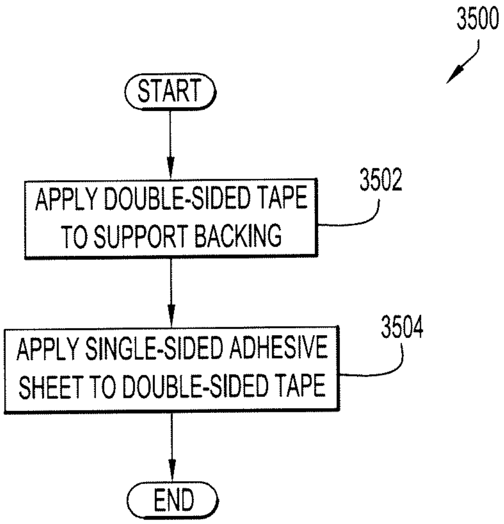
FIG. 35 is a flowchart of an exemplary process for affixing an adhesive layer to a support backing.

FIG. 35 is a flowchart 3500 of an exemplary process for affixing an adhesive layer to a support backing. The process in this embodiment includes applying a double-sided tape to the support backing (3502). The double-sided tape creates a strong bond with the support backing while providing a surface away from the support backing capable of a second strong bond. A single-sided adhesive sheet is applied to the double-sided tape (3504). The double-sided tape creates a strong bond with the non-adhesive side of the adhesive sheet. The adhesive sheet may include an adhesive with a weaker or temporary bond on a side away from the double-sided tape. The weaker adhesive may temporarily adhere a hair extension set, for example, to the support backing from manufacturing, through shipping, transportation, and a printing process, until an end consumer separates the hair extension set from the support backing. In some embodiments, the process for affixing an adhesive layer to a support backing includes a single step of applying an adhesive to the support backing, where the adhesive creates a strong bond with the support backing and a weak bond with a hair extension set mounted to the adhesive. The single-step process may reduce labor costs over a two-step process.

Figure 36:
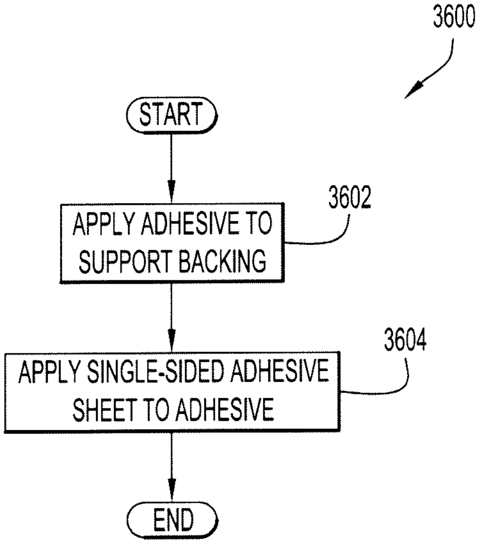
FIG. 36 is a flowchart of an alternative exemplary process for affixing an adhesive layer to a support backing.

FIG. 36 is a flowchart 3600 of an alternative exemplary process for affixing an adhesive layer to a support backing. The process in this embodiment includes applying an adhesive to the support backing (3602). A single-sided adhesive sheet is applied to the adhesive (3604). The single-sided adhesive sheet may include an adhesive with a weaker or temporary bond on a side away from the adhesive on the support backing.

Figure 37:
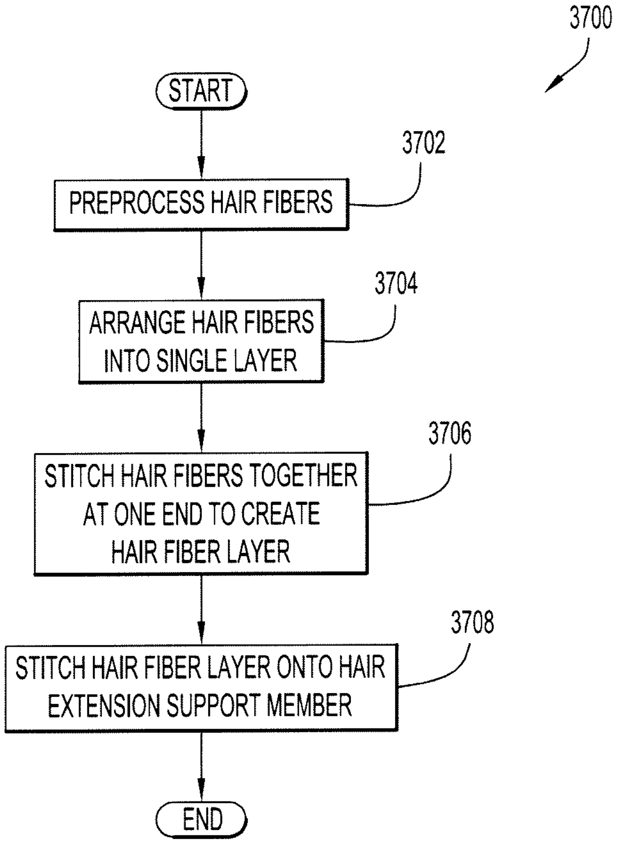
FIG. 37 is a flowchart of a second exemplary process for preparing a hair extension set for mounting.

FIG. 37 is a flowchart 3700 of a second exemplary process for preparing a hair extension set for mounting. A plurality of hair fibers are preprocessed (3702). The preprocessing may include coating the individual hair fibers with a receptive coating material and/or a sealant layer. The preprocessing may occur immediately after the manufacturing of the hair fibers or upon unwinding of a spool of the hair fibers after the spool has been transported. Coating the individual hair fibers at an early stage in the manufacturing process may provide a more thorough and complete coating of the material onto each individual hair fiber, while also allowing the hair fibers to maintain their individuality, and their ability to be groomed or combed, after the hair reaches the end consumer. The plurality of hair fibers are arranged into a single layer (3704). The hair fibers may be laid out on a flat surface and physically manipulated into a single layer. The single layer of hair fibers are stitched together at one end to create a hair fiber layer (3706). Stitching together the hair fibers to create a layer may aid in creating a cohesive unit for further processing. The hair fiber layer is stitched onto a hair extension support member (3708). The hair extension support member may be made from a natural or synthetic material, such as leather or vinyl. The hair extension support member may be pre-processed, such as having holes punched into it, or it may be post-processed, such as to have holes punched into it. In other embodiments, the hair fibers are first arranged into hair fiber bundles, and the hair fiber bundles are then arranged in a single layer and stitched onto the hair extension support member.

It is believed that the disclosure set forth above encompasses multiple distinct inventions with independent utility. While each of these inventions has been disclosed in a preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where any description recites "a" or "a first" element or the equivalent thereof, such disclosure should be understood to include incorporation of one or more such elements, neither requiring nor excluding two or more such elements.

While various embodiments of the skills game have been described, it will be apparent to those of ordinary skill in the art that many more embodiments and implementations are possible within the scope of the invention. Thus, it is intended that the present invention covers modifications and variations of this invention provided they come within the scope of the appended claims and their equivalents.

We claim:

1. A hair extension kit comprising:
- a support backing including a front side and a back side;
- an adhesive layer affixed to the front side of the support backing; and
- a hair extension set removably adhered to the adhesive layer, the hair extension set including:
  - a hair extension support member;
  - a plurality of hair fibers in a single layer affixed to the hair extension support member support member; and
  - a receptive coating applied to the plurality of hair fibers, wherein the receptive coating is a gel containing one or more water-soluble resins configured to receive printer ink in the surface of the water-soluble resin.

2. The hair extension kit of claim 1, wherein the adhesive layer is affixed to a first portion of the front side of the support backing, and the support backing is foldable such that a second portion of the front side covers the adhesive layer.

3. The hair extension kit of claim 1, where the support backing is sized for use with a standard printer.

4. The hair extension kit of claim 1 further comprising:
- a plurality of hair extension sets removably adhered to the adhesive layer.

5. The hair extension kit of claim 4, wherein a first set of the plurality of hair extension sets includes a single layer of hair fibers of a different length or width than a second set of the plurality of hair extension sets.

6. The hair extension kit of claim 1 further comprising a hair fastener coupleable to the hair extension support member.

7. The hair extension kit of claim 2 further comprising an intermediary sheet disposed between the first and second portions of the front side of the support backing, the intermediary sheet being configured to prevent the adhesive layer and the hair extension set from adhering to the second portion of the front side.

8. The hair extension kit of claim 7, wherein the front side of the support backing further comprises:
- a third portion, the second portion being disposed on a first edge of the first portion and the third portion being disposed on an opposite edge of the first portion, the third portion being the intermediary sheet.

9. A hair extension kit comprising:

a support backing including a front side and a back side;

an adhesive layer affixed to the front side of the support backing;

a hair extension set removably adhered to the adhesive layer, the hair extension set including:

a hair extension support member; and a plurality of hair fibers in a single layer affixed to the hair extension support member; and a hair fastener coupleable to the hair extension support member, the hair fastener including an accessory label, at least a portion of the accessory label being removably adherable to the front side of the support backing, the support backing being sized for use with a standard printer and the hair extension set and the accessory label each being configured to receive printer ink.

10. The hair extension kit of claim 9 wherein the hair fastener is one of a barrette, hair pin, hair clasp or bobby pin.

11. The hair extension kit of claim 9, wherein the hair fastener further comprises:

a base, wherein the base includes a first side and a second side, the first side of the base being coupleable to the fastener and the second side of the base being configured to receive the accessory label.

12. The hair extension kit of claim 9, further comprising:

an intermediary sheet disposed between a first portion and a second portion of the front side of the support backing, the intermediary sheet preventing at least a portion of the adhesive layer and the hair extension set from adhering to the second portion of the front side.

13. A hair extension kit comprising:

a support backing including a front side and a back side;

an adhesive layer affixed to the front side of the support backing;

a hair extension set removably adhered to the adhesive layer, the hair extension set including:

a hair extension support member; and a plurality of hair fibers in a single layer affixed to the hair extension support member, the plurality of hair fibers including a receptive coating, and the receptive coating including a polymer-based solution which allows the hair to set flat and stationary while providing an absorptive surface to retain printer ink from a standard printer.

14. The hair extension kit of claim 1 wherein the water-soluble resin includes at least one of polyvinyl acetate and polyvinylpyrrolidone.

15. A hair extension kit comprising:

a support backing including a front side and a back side;

an adhesive layer affixed to the front side of the support backing;

a hair extension set removably adhered to the adhesive layer, the hair extension set including:

a hair extension support member; and a plurality of hair fibers in a single layer affixed to the hair extension support member, the plurality of hair fibers including:

a receptive coating applied to form a receptive coating layer configured to receive printer ink; and a sealant layer, the sealant layer being applied to the hair subsequent to the application of the receptive coating and aiding in sealing printer ink to the hair.

16. The hair extension kit of claim 15, wherein the receptive coating and the sealant layer collectively create a hydrophobic coat which resists water and preserves a printer ink design underneath.

17. The hair extension kit of claim 15 wherein the support backing is sized for use with a standard printer.

18. The hair extension kit of claim 7, wherein the intermediary sheet is wax paper.

19. The hair extension kit of claim 13, wherein the adhesive layer is affixed to a first portion of the front side of the support backing, and the support backing is foldable such that a second portion of the front side covers the adhesive layer.

20. The hair extension kit of claim 13, wherein the support backing is sized for use with a standard printer.

* * * * *